US010009089B2

(12) United States Patent
Lehtinen

(10) Patent No.: US 10,009,089 B2
(45) Date of Patent: Jun. 26, 2018

(54) METHOD AND ARRANGEMENT FOR OPERATING A PHASED ANTENNA ARRAY

(71) Applicant: RF-shamaanit Oy, Vesijako (FI)

(72) Inventor: Markku Sakari Lehtinen, Sodankyla (FI)

(73) Assignee: RF-shamaanit OY, Vesijako (FI)

( * ) Notice: Subject to any disclaimer, the term of this patent is extended or adjusted under 35 U.S.C. 154(b) by 147 days.

(21) Appl. No.: 14/764,387

(22) PCT Filed: Jan. 28, 2014

(86) PCT No.: PCT/FI2014/050067
§ 371 (c)(1),
(2) Date: Jul. 29, 2015

(87) PCT Pub. No.: WO2014/118433
PCT Pub. Date: Aug. 7, 2014

(65) Prior Publication Data
US 2015/0372744 A1    Dec. 24, 2015

(30) Foreign Application Priority Data

Jan. 29, 2013 (FI) ...................................... 20135084

(51) Int. Cl.
H04B 7/06 (2006.01)
H01Q 3/26 (2006.01)
H01Q 3/40 (2006.01)
(52) U.S. Cl.
CPC ......... *H04B 7/0671* (2013.01); *H01Q 3/2682* (2013.01); *H01Q 3/40* (2013.01); *H04B 7/0615* (2013.01); *H04B 7/0617* (2013.01)

(58) Field of Classification Search
CPC ................................................. H04B 7/0671
See application file for complete search history.

(56) References Cited

U.S. PATENT DOCUMENTS 4,217,586 A * 8/1980 McGuffin ............. H01Q 3/2617
342/380
4,278,978 A * 7/1981 Frosch ................. H04B 7/0894
342/383

(Continued)

FOREIGN PATENT DOCUMENTS

GB    2357918    7/2001
GB    2440192    1/2008

(Continued)

OTHER PUBLICATIONS

EP Extended Search Report, EP Patent Application No. 14746433.3, dated Jul. 8, 2016.

(Continued)

*Primary Examiner* — Andrew Lai
*Assistant Examiner* — Andrew C Lee
(74) *Attorney, Agent, or Firm* — Andrus Intellectual Property Law, LLP

(57) ABSTRACT

An antenna unit is used in an antenna array. It comprises a measurement signal receiver for receiving and digitizing a measurement signal from an antenna. A time delay unit delays the digitized measurement signal. A data collection receiver receives a data collection frame, and a data collection transmitter is configured to sum the delayed digitized measurement signal with pre-existing data in the received data collection frame and to transmit the so constructed updated data collection frame further.

20 Claims, 11 Drawing Sheets

(56) References Cited

U.S. PATENT DOCUMENTS

| | | | | | |
|---|---|---|---|---|---|
| 5,130,717 | A | * | 7/1992 | Ewen | H01Q 3/2682 342/375 |
| 5,887,037 | A | * | 3/1999 | Golden | H04L 1/06 375/347 |
| 6,061,553 | A | * | 5/2000 | Matsuoka | H01Q 3/2605 455/273 |
| 6,148,219 | A | * | 11/2000 | Engelbrecht | H04W 64/00 455/456.2 |
| 6,157,343 | A | * | 12/2000 | Andersson | H01Q 3/267 342/174 |
| 6,160,510 | A | * | 12/2000 | Busking | H01Q 3/2605 342/374 |
| 6,324,160 | B1 | * | 11/2001 | Martin | H04B 1/7115 370/209 |
| 6,337,660 | B1 | * | 1/2002 | Esman | H01Q 3/2682 342/375 |
| 6,563,460 | B2 | * | 5/2003 | Stilp | G01S 5/021 342/457 |
| 6,624,784 | B1 | * | 9/2003 | Yamaguchi | H01Q 3/2605 342/372 |
| 6,665,286 | B1 | * | 12/2003 | Maruta | H04B 7/0851 370/335 |
| 6,982,968 | B1 | * | 1/2006 | Barratt | H04W 16/06 370/328 |
| 7,269,202 | B2 | * | 9/2007 | Nakao | H04B 7/08 375/147 |
| 7,277,051 | B2 | * | 10/2007 | Falk | G01S 7/034 342/373 |
| 7,394,424 | B1 | * | 7/2008 | Jelinek | H01Q 3/2682 342/375 |
| 8,149,166 | B1 | * | 4/2012 | Buxa | H01Q 3/26 342/372 |
| 2002/0064246 | A1 | * | 5/2002 | Kelkar | H04B 7/0845 375/347 |
| 2002/0072343 | A1 | * | 6/2002 | Miyatani | H04B 7/0848 455/272 |
| 2003/0090435 | A1 | * | 5/2003 | Santhoff | G01S 3/50 343/893 |
| 2003/0153322 | A1 | * | 8/2003 | Burke | H04B 7/0617 455/450 |
| 2003/0179819 | A1 | * | 9/2003 | Lomp | H04B 7/0894 375/222 |
| 2003/0214881 | A1 | * | 11/2003 | Yang | H04B 11/00 367/134 |
| 2005/0157683 | A1 | * | 7/2005 | Ylitalo | H04B 7/0634 370/334 |
| 2006/0038599 | A1 | * | 2/2006 | Avants | H03H 11/265 327/276 |
| 2007/0285312 | A1 | * | 12/2007 | Gao | H01Q 1/246 342/367 |
| 2008/0252524 | A1 | * | 10/2008 | Chu | H01Q 3/2682 342/375 |
| 2009/0231197 | A1 | * | 9/2009 | Richards | H01Q 3/267 342/377 |
| 2011/0109360 | A1 | * | 5/2011 | Dennis | G06F 1/10 327/161 |
| 2011/0142025 | A1 | * | 6/2011 | Agee | H04B 7/0413 370/342 |
| 2012/0020392 | A1 | * | 1/2012 | O'Keeffe | H01Q 3/267 375/221 |
| 2012/0328301 | A1 | * | 12/2012 | Gupta | H04L 27/2096 398/116 |
| 2014/0112667 | A1 | * | 4/2014 | Neukirch | H04B 10/25752 398/115 |

FOREIGN PATENT DOCUMENTS

| | | |
|---|---|---|
| WO | 2004030145 | 4/2004 |
| WO | 2011090886 | 7/2011 |
| WO | 2011152131 | 8/2011 |
| WO | 2012/158045 | 11/2012 |

OTHER PUBLICATIONS

International Preliminary Report on Patentability for PCT/FI2014/050067, dated Mar. 18, 2015.
International Search Report, PCT/FI2014/050067, dated Apr. 16, 2014.
International Written Opinion, PCT/FI2014/050067, dated Apr. 16, 2014.
Finnish Search Report, Finnish Patent Application No. 20135084, dated Sep. 23, 2013.

* cited by examiner

METHOD AND ARRANGEMENT FOR OPERATING A PHASED ANTENNA ARRAY

CROSS-REFERENCE TO RELATED APPLICATIONS

This application is the U.S. national stage application of International Application PCT/FI2014/050067, filed Jan. 28, 2014, which international application was published on Aug. 7, 2014, as International Publication WO2014/118433 in the English language. The international application is incorporated herein by reference, in entirety. The international application claims priority to Finnish Patent Application No. 20135084, filed Jan. 29, 2013, which is incorporated herein by reference, in entirety.

TECHNICAL FIELD

The invention relates in general to the technology of phased antenna arrays. Especially the invention relates to the task of arranging the communication connections and protocols between the antennas of the array and a processing unit.

BACKGROUND OF THE INVENTION

Angular resolution in radio or sonar measurements, such as those used for radio astronomy, radar, or sonar, is traditionally achieved by summing up the signals coming to the antenna. If parabolic reflectors are used, the summation occurs by the reflector directing the signals to a single focal point, where they add up together at an antenna or waveguide horn (or transducer) placed at the focal point. As constructive interference of the signals only occurs from the direction coinciding with the axis of the antenna, a narrow beam pattern is generated, facilitating high angular resolution of the signals received.

Instead of parabolic reflectors, arrays of smaller antennas (linear, planar or conformal to some surface—regularly or irregularly situated) are also well known in the art. In this case the signal summation is typically done by simple analog electronic devices summing together the elementary contributions. This is often complemented with time delays of the individual signals corresponding to differences in signal distance from the target point or direction to the individual antennas. If the time delays can be made adjustable, the beam direction or target focus location can be changed by changing the time delays so that it fits particular needs. The time delays are often accomplished by using specially trimmed cable lengths and/or cable systems where different lengths can be switched to facilitate different time delays. Also, elaborate systems of cabling such as Butler matrixes are well known to accomplish several different summations of signal copies to occur simultaneously and thus to facilitate formation of several beams at the same time.

Instead of a narrow beam in certain direction(s), the goal may also be to form a wider beam than the array would typically produce and thus to cover a wider angular view for target searching and detection purposes, for example. These kinds of techniques have been more recently developed and are called antenna coding in the literature. Also here summation of individual signals with somehow chosen weighting coefficients and time delays is the way this is accomplished.

Many of the tasks previously done by analog systems can be replaced by digital signal processing. Beam forming (or antenna coding) is one of these applications. In this case signals from individual antennas are sampled and the necessary time-delayed and weighted signal sums are performed by digital hardware such as computers or FPGA (Field Programmable Gate Array) or ASIC (Application Specific Integrated Circuit) based digital systems.

FIG. 1 illustrates a principle of a digitally controlled system where reception takes place through an antenna array. A number of antennas, an example of which is antenna 101, are available to receive a signal. From each antenna the received signal is conducted to a delay or phasing unit 102, which is configured to produce one or more delayed copies of each signal. A summing unit 103 receives the delayed copies and produces one or more summed signals. In other words, together the units 102 and 103 accomplish the beam forming mentioned above. Either of them may also be configured to perform antenna-specific weighting before the summing is done.

The further processing unit 104 comprises all such functions that a conventional receiver with one antenna would have. The signal it receives from the summing unit 103 resembles one that would be received with a very large single antenna used in place of the antenna array. An additional unit 105 is shown to include control, storage, and user interface functions. Through this unit the user may program the antenna-specific delays in the delay or phasing unit 102 and affect the way in which the summing is done in the summing unit 103.

It is easy to see that a large number of antennas in the array of FIG. 1 means an extremely large amount of cabling. An antenna array may have tens of thousands of individual antennas or even more, distributed over an area with dimensions measured in kilometers. If the antennas constitute a roughly square matrix with N antennas on a side, the number of connections increases in proportion to $N^2$. The larger the system grows, the more complicated become tasks like cable ditch digging and protecting the cabling against animals and other environmental risks. Also the physical and logical task of arranging the inputs from tens of thousands of lines to the central beam forming unit becomes formidable.

Reference US 2009/231197 discloses a phased antenna array arrangement for transmitting and receiving wireless signals with adjustable beam-forming capabilities. The structure of the receiver part is shown in FIG. 5 and the transmitter part in FIG. 7. The principal method is shown in the flow chart of FIG. 8. As it is evident through these figures and the corresponding description, the signal is received in an antenna element, the signal is demodulated into baseband samples, and the baseband samples are combined with baseband samples received from one of the other receive modules, and the combined baseband samples are communicated to a central processing unit.

Concerning FIG. 8 and its related description in paragraph [0084], after the receive time offsets and phase shifts, i.e. complex weights, have been communicated from the control processor to the receive modules, a first of the receive array elements receives a signal via the antenna element. Upon receiving the signal, a receive processor of the receive module demodulates the signal, to determine baseband samples. The demodulation process includes both the analogue and digital demodulation processes. Continuing into paragraph [0085], the receive module combines the baseband samples with baseband samples received from one of the other receive modules.

As it is thus evident from the description and Figures of this reference, the received signal requires to be demodulated into the baseband before the combination process takes place, in all embodiments of the reference. Correspondingly, the transmitter side (FIG. 7) reveals that the delaying, filtering and weighting steps are performed to the signal firmly locating in the baseband, that is, before the mixer.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to provide a method and an arrangement for constructing and operating an antenna array in a way that enables keeping the amount of cabling reasonable. Another objective of the invention is to enable scaling the size of an antenna array with reasonable requirements of changes to structures and programming. Yet another objective of the invention is to enable fast and effective collection of received signals from even very large antenna arrays.

The objectives of the invention are achieved by chaining antenna units together and combining the summing task with the task of collecting data from the antennas along the chain.

According to an aspect of the invention there is provided an antenna unit for use in an antenna array. An antenna unit according to the invention is characterized by the features recited in the characterizing part of the independent claim directed to an antenna unit.

According to another aspect of the invention there is provided an antenna arrangement, which is characterized by the features recited in the characterizing part of the independent claim directed to an antenna arrangement.

According to another aspect of the invention, in an antenna arrangement at least one antenna has a shape of a slanted bowtie antenna, which slanted bowtie antenna comprises a container for the electronics, and a support structure comprising four legs, the four legs together forming at least one wideband antenna.

According to another aspect of the invention, in an antenna arrangement at least one antenna has a shape of a screwpile, the screwpile antenna comprising a stilt, a container for the electronics, a coarse spiral thread at a sharp end of the stilt, and radial spars extending to the sides of the stilt.

According to yet another aspect of the invention there is provided a method for operating an antenna array. A method according to an invention is characterized by the features recited in the characterizing part of the independent claim directed to a method.

Chaining the antenna units, circulating a data collection frame, and summing the properly delayed contribution from each antenna with pre-existing data in the data collection frame enables increasing the number of antennas (or antenna groups) in the chain with little or no additional increase in the bandwidth required for collecting the data. The data rate in the connection through the chain of antenna units, through which the collection of data is accomplished, can be completely independent of the number of antenna units in the chain; adding antenna units to the chain may increase the overall delay before the collected data arrives at the central unit, but this has seldom any negative consequences because strictly real-time results of the reception may not be needed anyway.

Signals received by individual antennas or antenna groups need not be transported to the central unit for beam forming. The computational tasks required by time-delaying and summing can be distributed among a number of relatively simple and inexpensive units, which greatly helps in constructing and operating the central unit. The same cabling that is used for data collection can also be used for distributing a time reference among the distributed units, for sending control information from the central unit to the distributed units, and even for sending auxiliary information from the distributed units to the central unit.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF EMBODIMENTS OF THE INVENTION

Figure 2:
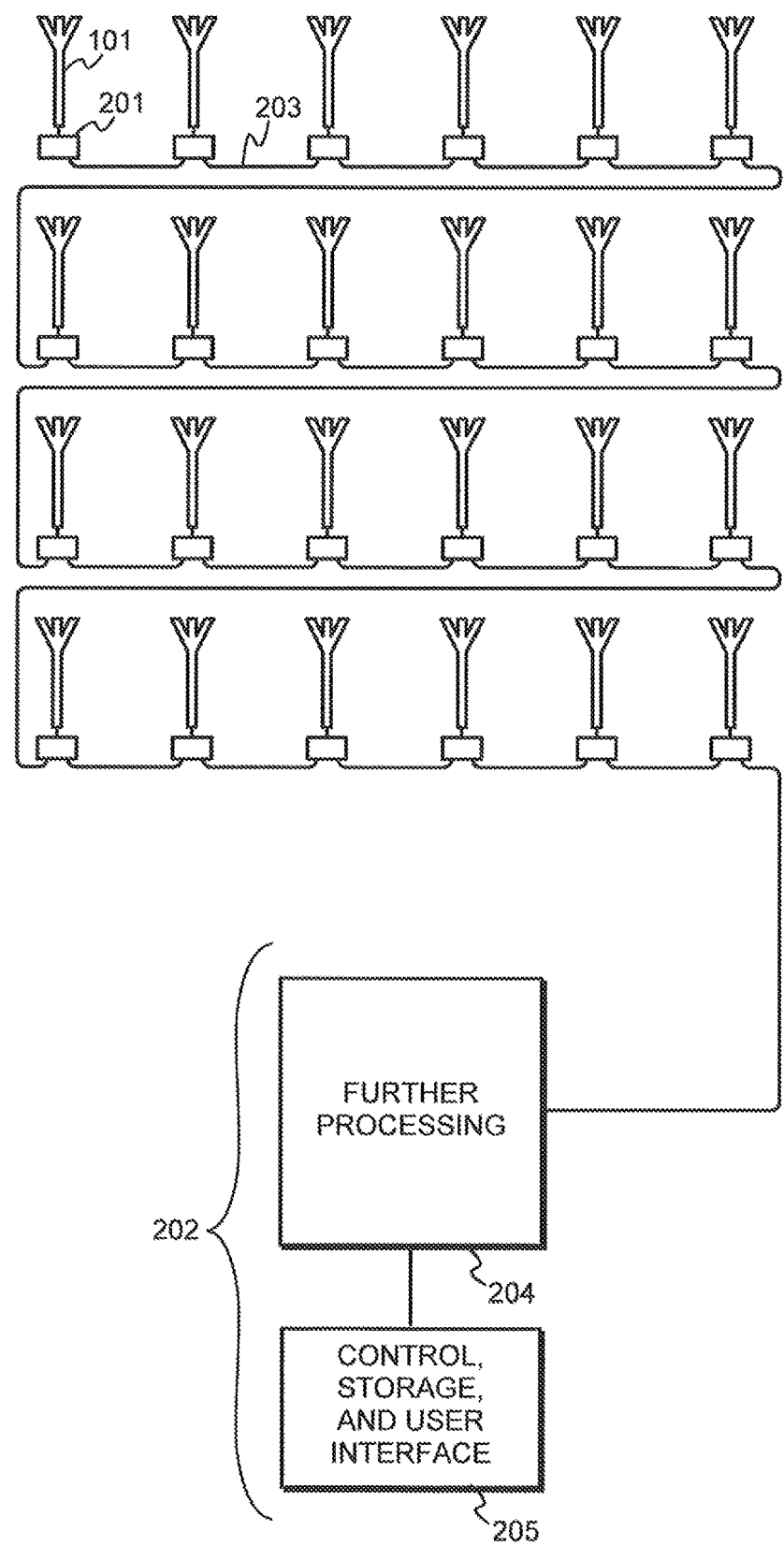
FIG. 2 illustrates a principle of chaining antenna units.

FIG. 2 illustrates an antenna arrangement, which comprises a multitude of antennas for use as an antenna array. As such the antennas may be similar to any previously known antennas, for which reason the same reference number 101 is used for an exemplary antenna as in the description of prior art. In order to be used as an antenna array they are typically distributed over a relatively large area. The signal that is received by the antennas is called a measurement signal.

The antenna arrangement comprises a multitude of functional blocks which are designated as antenna units in this description. In this description we use the designation "antenna unit" to refer to a functional block, which does not (necessarily) include the antenna proper but which includes electronic components arranged to process signals received through the antenna(s) and to communicate with other antenna units. Antenna unit 201 is shown as an example. Each antenna unit is coupled to receive a measurement signal from at least one of the antennas. A one-to-one relationship of antennas and antenna units is shown here as an example, but several other configurations are possible, as will be described later in this description. An entity that comprises one or more antennas, the corresponding antenna unit, and mechanical support for these may be called an antenna structure.

The antenna arrangement comprises a central unit 202, which could also be called the central processing station or the main control unit. A data collection line 203 couples the antenna units to the central unit 202. In particular, the antenna units form a chain along the data collection line 203. Each antenna unit is configured to digitize the respective measurement signal before communicating it to the central unit 202 through the data collection line 203. Each antenna unit is also configured to delay the respective measurement signal in an appropriate way, which will be described in more detail later.

Figure 3:
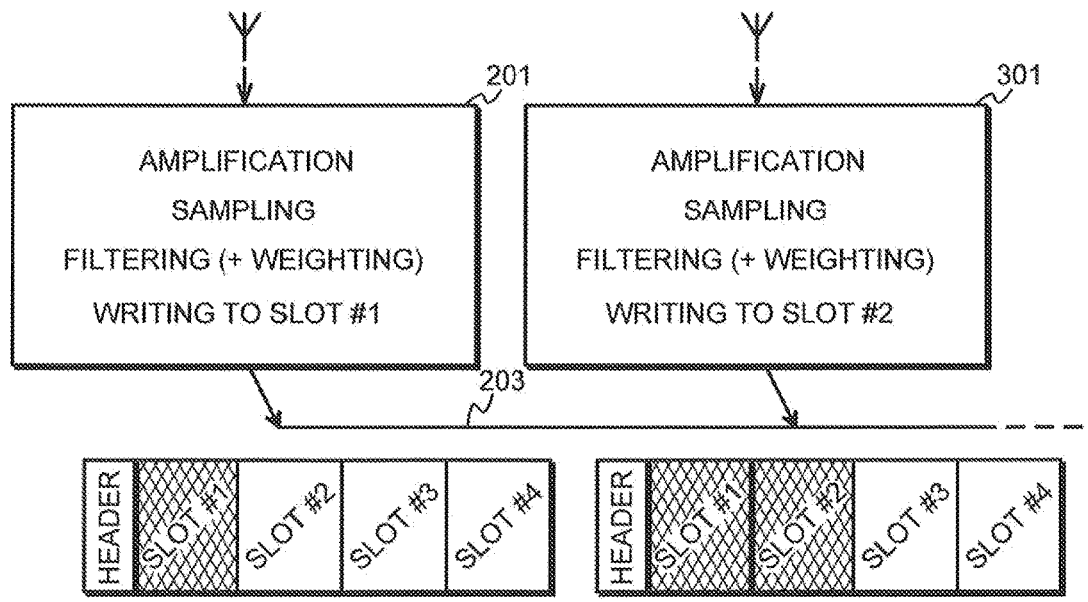
FIG. 3 illustrates a principle of concatenating measurement signals in a data collection frame.

FIG. 3 illustrates a first approach to communicating received measurement signals from the chained antenna units to the central unit. Two consecutive antenna units 201 and 301 along the data collection line 203 are shown. We assume that data is communicated through the data collection line 203 in data collection frames, so that each data collection frame comprises a header and one or more slots. The slots may be for example time slots (as in time division multiplexing), frequency slots (as in frequency division multiplexing), code slots (as in code division multiplexing), or any combinations of these. In the approach shown in FIG. 3 one slot is reserved in the data collection frame for each antenna unit.

The functions implemented in an antenna unit comprise amplifying the received measurement signal; sampling the measurement signal and representing the samples with digital values; possibly filtering and/or weighting the measurement signal; as well as writing the obtained result into the appropriate slot of data collection frames communicated through the data collection line 203. The measurement signals from consecutive antenna units become concatenated in the data collection frame as is illustrated at the lower part of FIG. 3. Logically we may describe the communications so that each antenna unit writes on its turn onto the data collection line, which is figuratively shown in FIG. 3 with the arrows pointing from the antenna units to the data collection line 203.

If the communications over the data collection line are arranged according to FIG. 3, the central unit will get a pristine copy of the measurement signal as received through each antenna of the antenna array. The drawback is that the data collection frame used for communications on the data collection line becomes very large: the required number of slots in the data collection frame is directly proportional to the number of antennas in the antenna array. Properly delaying and summing the measurement signals from different antennas at the central unit will also be relatively complicated.

Figure 4:
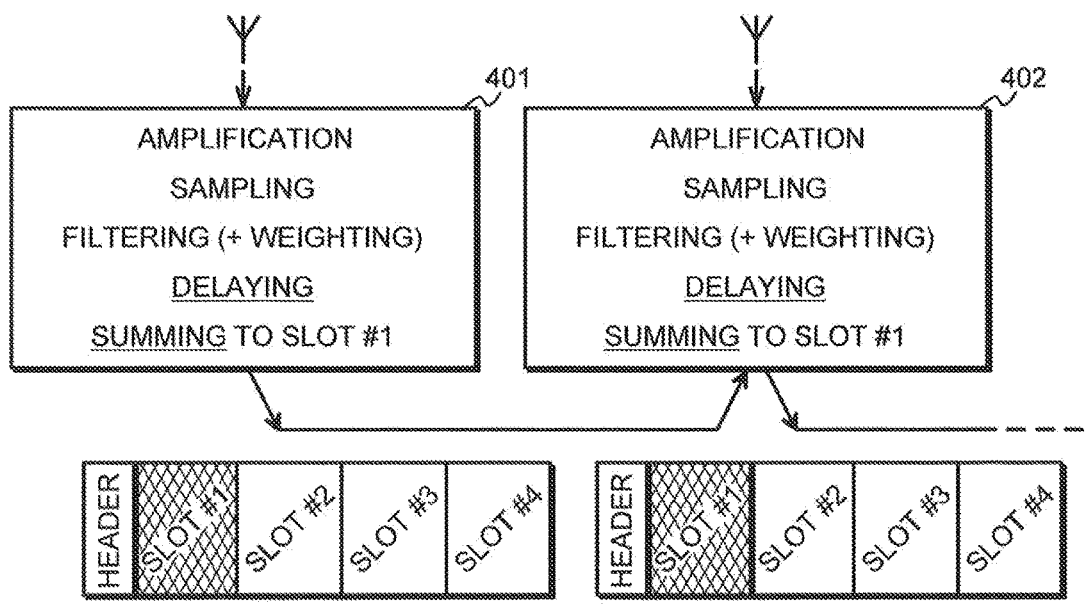
FIG. 4 illustrates a principle of summing measurement signals in a data collection frame.

FIG. 4 illustrates a second approach to communicating the measurement signals from the chained antenna units to the central unit. The difference to the approach of FIG. 3 is that the delaying and summing of measurement signals received through different antennas, which constitutes the core of digital beamforming, is done in a distributed manner utilizing the antenna units and the data collection line.

Each antenna unit 401 and 402 has been made aware of the delay to be used for the respective measurement signal. The measurement signal is appropriately delayed in the antenna unit. Several ways of delaying are possible, and will be discussed later in more detail. When the data collection frame proceeds along the data collection line 203 from one antenna unit to another, the latter antenna unit reads the pre-existing data that the previous antenna unit(s) have produced. The appropriately delayed digitized measurement signal is summed to the pre-existing data, which makes the delayed measurement signals accumulate in the same slot (slot #1 in FIG. 4). After the summing the updated data collection frame is transmitted further. Figuratively this "read+sum+write" operation is illustrated in FIG. 4 with the data collection line diverting momentarily to the right-hand antenna unit.

The central unit (not shown in FIG. 4), which eventually receives the data collection frame, is configured to read the sum of delayed digitized measurement signals from the data collection frame. The data collection frame may comprise other slots (slot #2, slot #3, and slot #4 in FIG. 4) than that discussed above.

Figure 5:
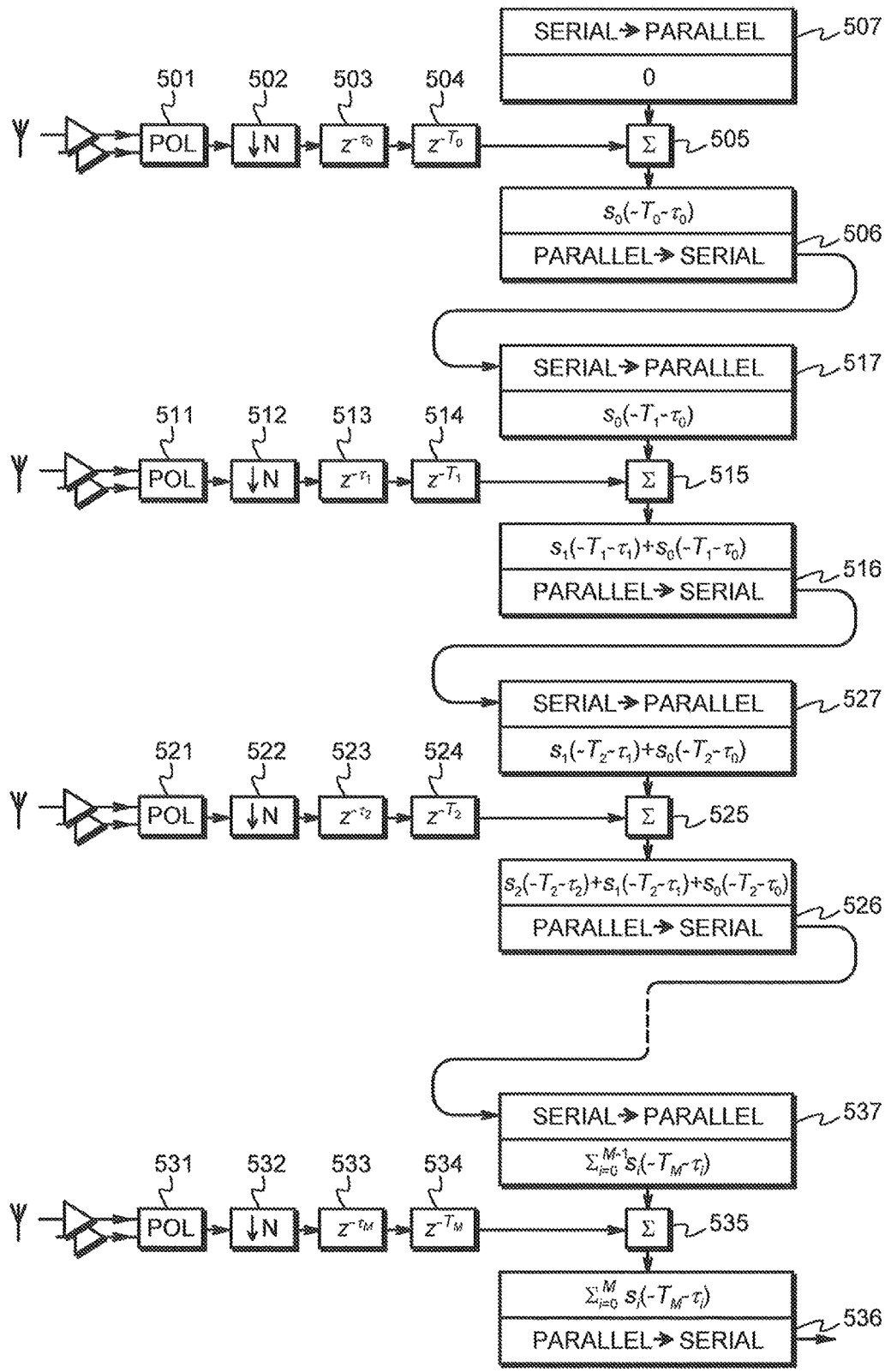
FIG. 5 illustrates an example of forming one beam.

FIG. 5 is a more systematic illustration of the approach described above with reference to FIG. 4. Four antenna units are illustrated in FIG. 5, and indexed as the 0th, 1st, 2nd, and M:th antenna unit. They are all chained along the same data collection line, so that the 0th antenna unit is furthest upstream from the central unit (which is not shown in FIG. 5). The term "upstream" is used here to refer to the opposite of the "downstream" direction in which the accumulating sums of delayed, digitized measurement data flow towards the central unit. We use the general notation $s_i(t)$ for a time-dependent, digitized measurement signal that was received by the i:th antenna unit, where the index $i \in [0, 1, 2, \ldots, M]$ is just the ordinal number of the antenna unit.

We assume, as an example, that each antenna unit is coupled to receive signals at two polarizations from one or two antennas, and that each antenna unit comprises functional units for polarization combination and downsampling, which for example in the 0th antenna unit are illustrated as blocks 501 and 502 respectively. In the vocabulary adopted in this description, these belong to the category of receiving and digitizing a measurement signal from the respective antenna(s).

Additionally each antenna unit comprises a time delay unit for delaying the digitized measurement signal. The delaying can be considered in two parts, which are the delay used for beam forming and the delay used to compensate for the propagation delay of the data collection frame on its way between antenna units along the data collection line. For example the block illustrated as 503 in the 0th antenna unit delays the digitized measurement signal by $\tau_0$, and the block illustrated as 504 causes a delay $T_0$, which may be a zero delay. Since the 0th antenna unit is the one furthest upstream from the central unit, there is no pre-existing data in the data collection frame, so the "summed" signal produced by the summing unit 505 is $s_0(-T_0-\tau_0)$, or just $s_0(-\tau_0)$, if $T_0=0$. We assume that the summing unit 505 performs parallel operations but the data collection line utilizes serial communications, for which reason the summed signal is converted to serial form for transmission in the data collection transmitter 506.

Each antenna unit comprises a data collection receiver; for example the data collection receiver 517 of the 1st antenna unit receives the data collection frame from the data collection transmitter 506 of the 0th antenna unit. The data transmission cycle along the data collection line between the 0th and the 1st antenna units takes a time $T_1$, measured from the moment of beginning the transmission of a data collection frame from the 0th antenna unit to the moment of beginning the transmission of the same data collection frame onwards from the 1st antenna unit. Thus the pre-existing data that is available for summing in the 1st antenna unit after the serial to parallel conversion represents the signal $s_0(-T_1-\tau_0)$. (For the simplicity of notation we assume that the time it takes for an antenna unit to perform the actual summing is negligible; if we allocated a time $\Delta t$ for the summing, the pre-existing data available to the summing unit 515 after the serial to parallel conversion in the data collection receiver 517 should be $s_0(-(T_1-\Delta t)-\tau_0))$.

The part of the delay unit in the 1st antenna unit that is illustrated with block 514 is configured to delay the respective measurement signal by exactly as much as it took for the data collection frame to arrive from the 0th antenna unit. In other words, the delay made in block 514 is $T_1$ (or, with the reservation above, $(T_1-\Delta t)$). Thus after the summing in the summing unit 515 the signal that will be sent further in the updated data collection frame is $s_1(-T_1-\tau_1)+s_0(-T_1-\tau_0)$.

Each transmission cycle between two consecutive antenna units adds its share to the transmission delay. Thus after the summing in the summing unit 534 of the M:th antenna unit, the signal that will be sent further in the updated data collection frame is in general of the form $\Sigma_{i=0}^{M} s_i(-T_M-\tau_i)$. The delay $T_i$, $i \in [0, 1, 2, \ldots, M]$, which is compensated for in the blocks illustrated as 504, 514, 524, and 534 respectively and which is called transmission delay above, compensates for all time delays from the beginning of the chain to the i:th antenna unit, including delays caused by the signals being latched in the parallel-to-serial and serial-to-parallel converters of the antenna units as well as actual transmission delays as the data collection frames are transported in the links between the antenna units. The actual time delays for beam forming are then taken into account by $\tau_i$.

Weighting can be used in the arrangement illustrated in FIG. 5 to change the relative importance of each measurement signal in the sum. Each antenna unit may comprise a weighting unit for weighting the digitized measurement signal before, after, or during its delaying in the respective time delay unit. Notationwise the weighting may be e.g. part of blocks 503, 513, 523, and 533.

With digitally sampled signals, time delays can be calculated by several ways, including but not being limited to:
sampling the signals at suitable (delayed) times,
using high enough sample rates, keeping a number of recent samples in the computer memory, and choosing the properly delayed samples for the summation process,
generating the delays by filtering the sample stream with a properly designed digital delay filter (particularly if more accurate delays than an integer multiple of the sample interval are necessary), and approximating the time delays of the signal by ignoring any integer multiple of the carrier signal cycle time.

The last-mentioned alternative is available if the bandwidth of the signal is narrow enough and the required time delay is small enough relative to a carrier frequency. Equivalently, if the signal is converted to the complex domain (IQ samples), multiplication by the complex phase of the carrier corresponding to the required time delay may be accurate enough to approximate the time delays.

Neither the way the time delays are accomplished nor the signal decimation or preprocessing details are essential to the invention described here. Prior to beam forming some operations on antenna signals may be performed such as combination of polarizations in case of electric signals (as illustrated by blocks 501, 511, 521, and 531 in FIG. 5) or combination of modes of acoustic signals. Also, preliminary beam forming of a small group of antennas may be performed before sending the signals to the actual beam former for the whole array or larger part of array. How this is done is also not essential.

Figure 6:
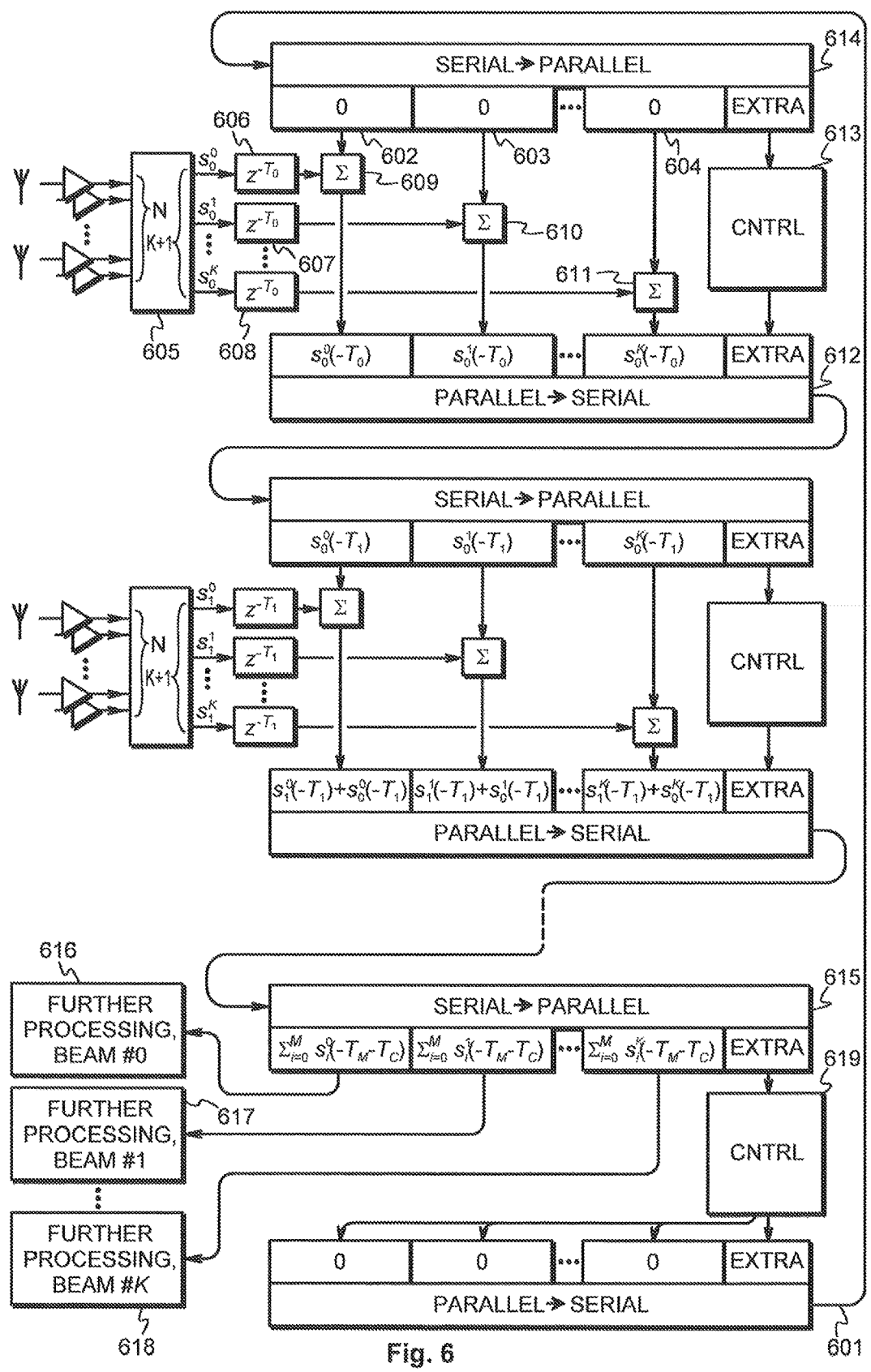
FIG. 6 illustrates an example of forming several beams simultaneously.

FIG. 6 illustrates certain generalizations to the concepts discussed so far. For example, one antenna unit may be coupled to receive measurement signals from any number of antennas. Another important generalization is the use of a number of slots in a data collection frame to convey sums of differently delayed digitized measurement signals, corresponding to a number of different beams.

Two antenna units, designated as the 0th and 1st antenna unit respectively, and a central unit are schematically illustrated in FIG. 6. The data collection line constitutes a loop, so that the circulation of a data collection frame is initiated by sending it with empty slot(s) from the central unit to the 0th antenna unit along line 601. The pre-existing data available for summing in the 0th antenna unit is zero for all K+1 slots, as is illustrated by blocks 602, 603, and 604.

Block 605 is essentially an N-input/(K+1)-output filter, which can be represented for example as a FIR (Finite Impulse Response) filter. This means that the output of the filter is the convolution of the input with the filter coefficients. An N-input/(K+1)-output FIR filter with length L may have L×N×(K+1) coefficients, and it represents operations such as delaying, weighting, and possible changes in sampling rate. The delaying (and possible weighting) that in FIG. 5 was illustrated with block 503 is included in the operations made in block 605. Instead of a FIR filter, the block 605 can also be represented in some other filter form, like an ARMA (AutoRegressive Moving Average) filter. Depending on the chosen way of signal decimation, the signal samples may be represented by either real or complex values, and the filters discussed then also have real or complex coefficients.

Each of the K+1 outputs of the block 605 can carry a differently delayed (and weighted) signal, which can be used for digitally forming a different beam in the antenna array. Since $N \in [1, 2, 3, \ldots]$ in FIG. 6 and N has no specific relation to K, the output signals $s_0^0, s_0^1, \ldots, s_0^K$ may originate from the inputs in various ways: in the simplest case, if there is only one antenna (N=1; or with two polarizations N=2), all outputs represent differently delayed copies of the measurement signal received through the same antenna.

The additional parts of the delay unit, which are explicitly illustrated as blocks 606, 607, and 608, add the delay that is used to compensate for the time it takes for the data collection frame to be transmitted between antenna units along the data collection line. In the 0th antenna unit this additional delay is $T_0$, which may be zero or in general a suitably selected constant. The pre-existing data for all slots was zero, so the sums produced by the summing units 609, 610, and 611 are $s_0^0(-T_0)$, $s_0^1(-T_0)$, and $s_0^K(-T_0)$ for the 0th, 1st, and K:th slot respectively. In this notation the lower index of s refers to the antenna unit, and the upper index refers to the slot. Together these indices identify the delay made in block 605 to make the signal contribute correctly to the beam forming (i.e. the delay for which the t notation was used in FIG. 5), so the argument $-T_0$ in the brackets only needs to indicate the amount of delay made in blocks 606, 607, and 608 respectively.

Above it was explained how, in the general case of FIG. 6, the time delay unit in the 0th antenna unit, illustrated with blocks 605, 606, 607, and 608 together, is configured to produce a multitude of delayed copies of the digitized measurement signal. These need not be "copies" of each other in strict sense since some of them may actually come from different antennas, if the dimension N of the block 605 is greater than one; the word "versions" could be used instead. The data collection transmitter 612 is configured to sum said delayed copies of the digitized measurement signal with pre-existing (here: zero) data in different parts in the data collection frame, and to transmit the so constructed updated data collection frame further to the 1st antenna unit.

FIG. 6 illustrates also an internal control unit 613 of the antenna unit. The data collection receiver 614 of the antenna unit is configured to read control information from a received data collection frame, and to forward the control information to the internal control unit 613. The part of the data collection frame that is used to convey the control information may comprise one or more "extra" slots; also if the data collection frame comprises a header, a part of the header or even the whole header of the data collection frame could be used for this purpose. Thus the data collection frame may not be completely empty when it is put into circulation by the central unit: it may comprise control information that the central unit wants to send to one or more antenna units. As an example, the central unit may send configuration information to the antenna units regarding the delays to be used in beam forming: it may "re-program" the antenna units for the production of different kinds of antenna beams. It may also send other kinds of commands, such as for example status requests or test commands.

The logical channel(s) constituted by the extra slot(s) may also be used in the other direction, so that at least one antenna unit may be configured to write auxiliary information to a dedicated part of the data collection frame. With "dedicated" it is meant that the part is different from those parts of the data collection frame that contain sums of delayed digitized measurement signals; in the notation of FIG. 6 it belongs to the "extra" slot(s). Auxiliary information may comprise for example error alerts or status reports of the antenna unit, or even information that is not at all related to beam forming, such as outside temperature or moisture readings.

An important variety of control information is timing information. In order to work properly, the invention requires relatively good synchronization in time among all antenna units and the central unit. The internal control unit 613 may comprise a timing unit, which is configured to synchronize an internal time base of the antenna unit with a timing indicator associated with the received data collection frame. The timing indicator being "associated" with the data collection frame means that it does not necessarily need to be any piece of information that would explicitly form a part of the information content of the data collection frame. The timing indicator may be e.g. the moment of arrival of the data collection frame at the data collection receiver of the antenna unit. In large systems with a number of distributed devices it is customary to employ a tree-like distribution scheme of a timing signal, so that a central clock (typically located at the central unit) is the most accurate. It sends a timing indicator to lower-level clocks, of which there may be a number of tiers in the branching, tree-like structure. Each lower-level clock in turn distributes timing indicators further in the structure, and these timing indicators are used to keep the "flywheel" type lower-level clocks synchronized.

The central unit is schematically illustrated in the lowest third of FIG. 6. It comprises a data collection receiver 615, which is the endpoint of the data collection line, along which the antenna units are chained. At its arrival at the central unit, a sum of delayed digitized measurement signals in the data collection frame has the general form $\Sigma_{i=0}^{M} s_i^K(-T_M-T_c)$, where $k \in [0, 1, 2, \ldots, K]$ is the slot index, and the additional delay parameter $T_c$ or "time to central" is the time it took for the data collection frame to travel from the last (M:th) antenna unit to the central unit (at the time of transmission from the last antenna unit towards the central unit, the same sum had the form $\Sigma_{i=0}^{M} s_i^K(-T_M)$). In the general case of FIG. 6 the central unit is configured to read a multitude of sums of differently delayed digitized measurement signals from different parts of the data collection frame.

Figure 1:
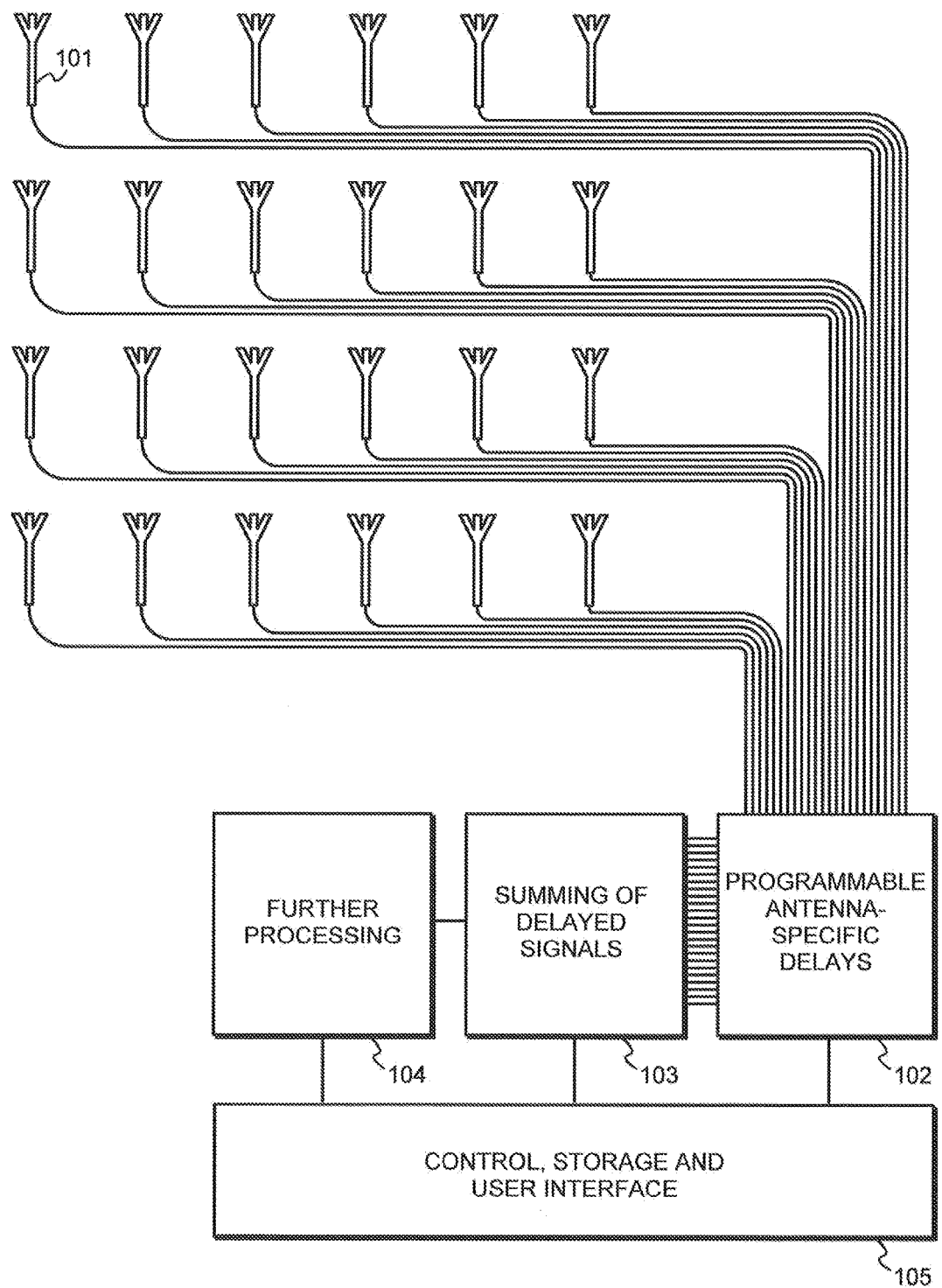
FIG. 1 illustrates a prior art antenna array and central unit.

The (differently) delayed sum(s) in the appropriate slot(s) of the data collection frame has (have) accumulated gradually while the data collection frame has been circulated among the antenna units along the data collection line. Thus the delaying and summing, which in the prior art arrangement of FIG. 1 were made in blocks 102 and 103 of the central unit, is done already, so the sums may be conveyed directly to beam-specific further processing as illustrated by blocks 616, 617, and 618.

The control unit 619 of the central unit may act as both a control information receiver and a control information transmitter. In the latter role it is configured to transmit control information to the antenna units along a control information channel. There may be a separate control information line between the central unit and the antenna units for conveying the control information channel. When the data collection line is loop-formed as illustrated in FIG. 6, the control information channel may constitute a logical channel conveyed on the loop-formed data collection line. In the embodiment illustrated in FIG. 6 the control unit 619 is also responsible for initializing the slots of the data collection frame to their initial (zero) value before putting the data collection frame into circulation along the data collection line.

Figure 7:
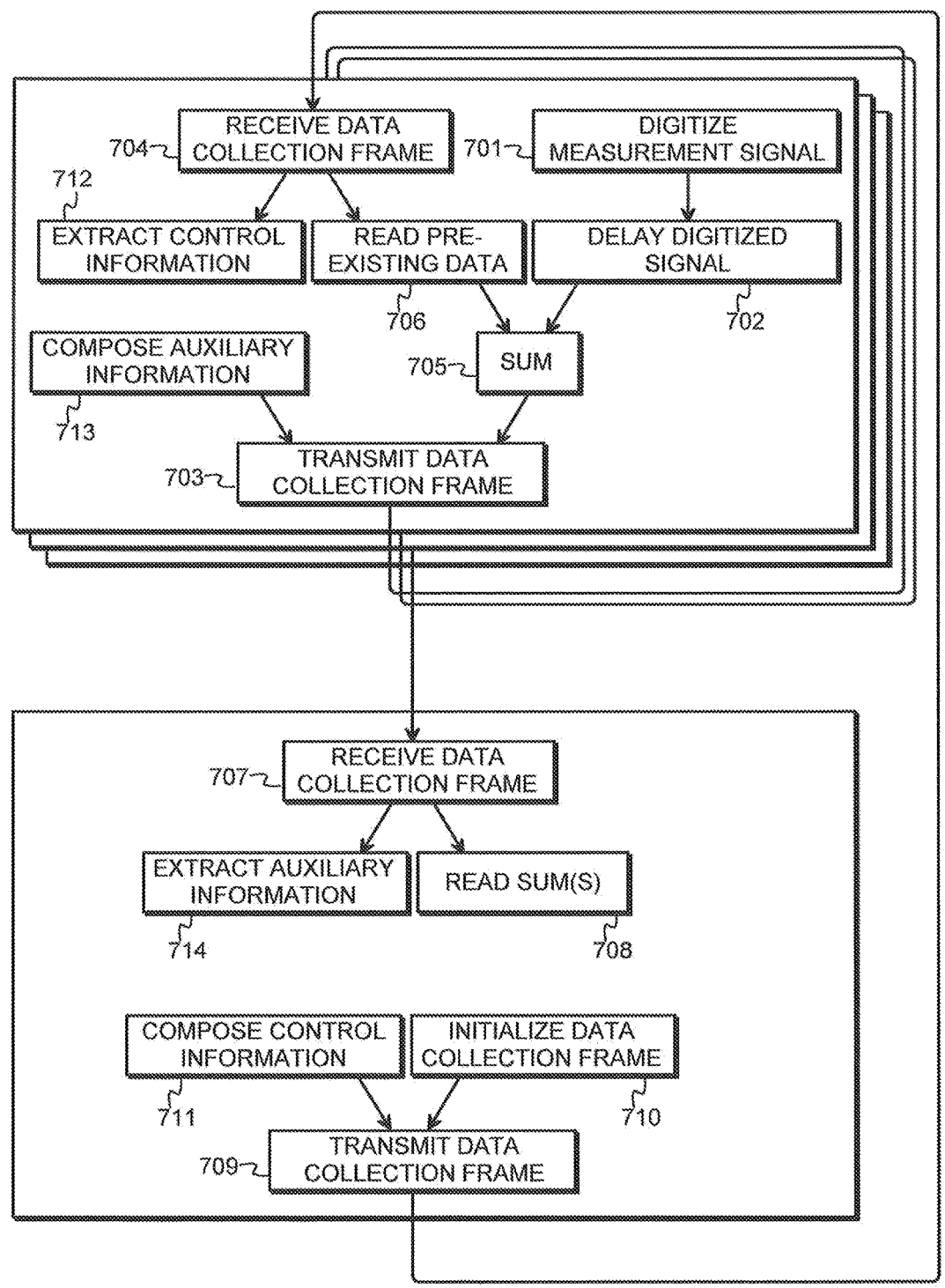
FIG. 7 illustrates a method and a computer program product.

FIG. 7 is a schematic illustration of the method and computer program product aspects of the invention. A computer program product according to an aspect of the invention comprises machine-readable instructions stored on a non-transitory medium that, when executed by a computer, cause the implementation of the steps of the method. Since the method involves operations performed in the antenna units as well as operations performed in the central unit, the method and computer program product aspects of the invention may be divided into those pertinent to an antenna unit and those pertinent to a central unit. In FIG. 7 the former appear in the upper part of the drawing and the latter in the lower part of the drawing.

Step 701, which may be executed similarly in a multitude of antenna units, corresponds to digitizing measurement signals received through a multitude of antennas. Step 702 corresponds to delaying each digitized measurement signal, thus producing respective delayed digitized measurement signals. Transmission and reception at steps 703 and 704 respectively correspond to circulating a data collection frame through a chain of antenna units that digitized and relayed their respective received measurement signals. At each antenna unit the method comprises summing the respective delayed digitized measurement signal with pre-existing data in the data collection frame, as illustrated by step 705. Pre-existing data has been extracted at step 706 from the data collection frame received by the antenna unit.

The operations represented by the transmission step (like step 703) in the last antenna unit in the chain and the reception step 707 at the central unit correspond respectively to the antenna-unit-end and the central-unit-end parts of conveying the circulated data collection frame to a central unit of the antenna array. The method may comprise making at least some of said antenna units produce two or more differently delayed copies of their respective digitized measurement signals and sum these differently delayed copies with pre-existing data in different parts of said data collection frame. Such operations would be included in steps 701, 702, 705, and 706 of FIG. 7. Step 708 corresponds to the central unit reading a sum of delayed digitized measurement signals from a data collection frame conveyed to the central unit along the data collection line.

Step 709 corresponds to initiating the circulation of said data collection frame by sending it from the central unit to the first antenna unit in the chain. Together with the initialization of the data collection frame at step 710 and the composing of the control information at step 711, and also with the extraction of control information at step 712, step 709 also corresponds to conveying control information in the data collection frame from the central unit to at least some of said antenna units.

Composing auxiliary information in the antenna unit at step 713, extracting such auxiliary information in the central unit at step 714, as well as the transmission and reception steps 703 and 707 correspond to conveying auxiliary information from at least one of the antenna units to the central unit in a dedicated part of the data collection frame. The dedicated part is different from the part that contains the sum(s) of delayed digitized measurement signals.

The embodiments discussed so far only considered one chain of antenna units. Although the length of the data collection frame is immune to any increasing number of antenna units along the chain, each transmission cycle between two consecutive antenna units increases the delay it takes before the accumulated sum becomes available to the central unit.

If the increasing delay would constitute a problem, the antenna array can be arranged in parallelly operating subgroups and/or hierarchical data collection structures in various ways. This may also enable the central unit to perform some more advanced processing than simple weighted and time delayed summation between the parallel subgroups. This could be for example beam forming based on correlated signals between the individual subgroups.

Figure 8:
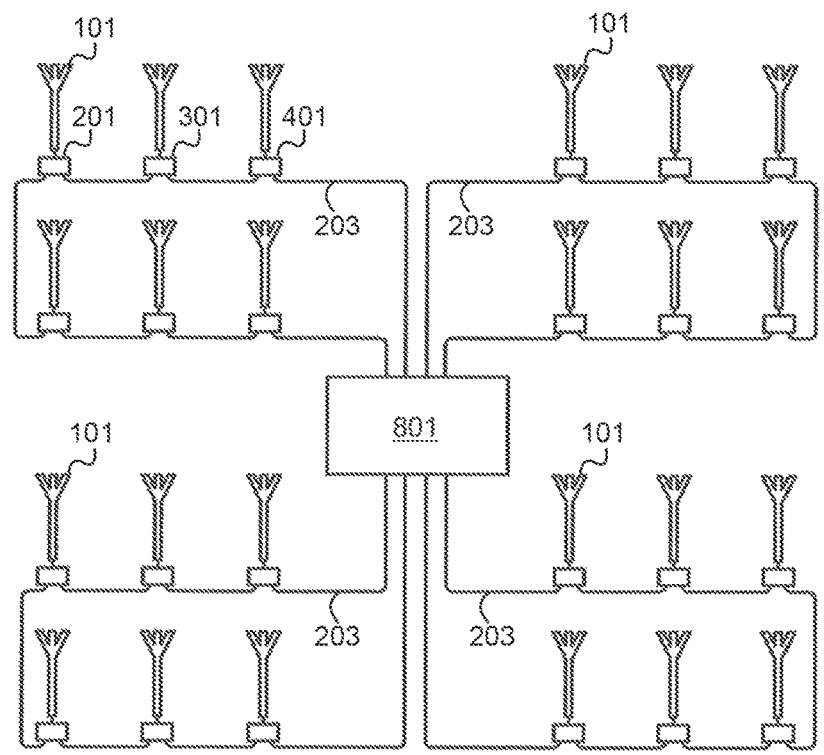
FIG. 8 illustrates one way of arranging data collection lines.
Figure 9:
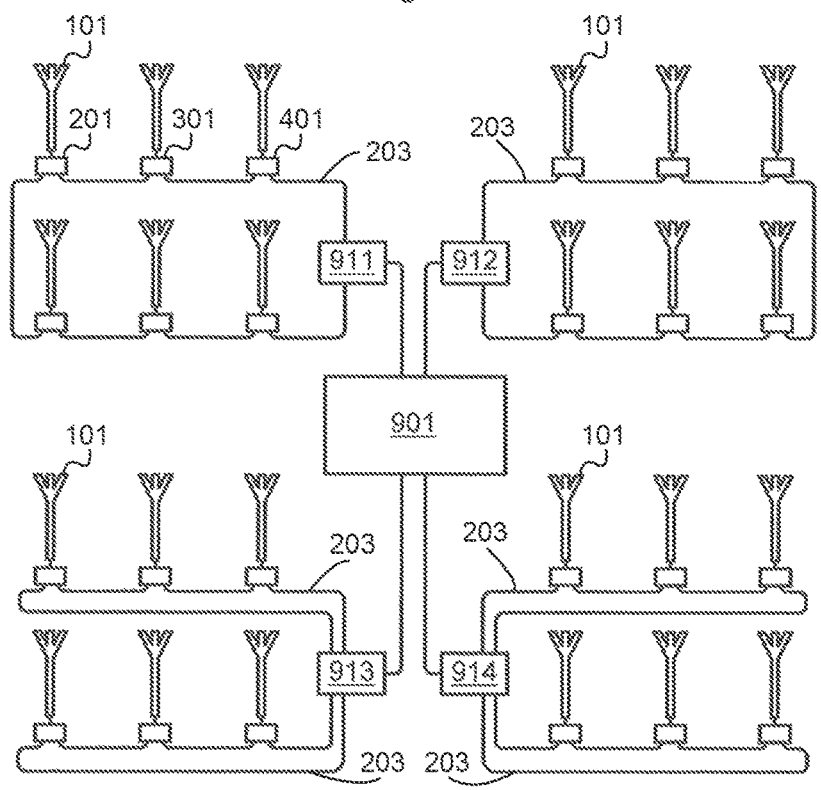
FIG. 9 illustrates another way of arranging data collection lines.

As an example, FIG. 8 illustrates how a large antenna array may comprise a number of data collection lines, each of which constitutes a loop that begins and ends at the central unit 801. In the exemplary arrangement of FIG. 8 the total delay in getting the accumulated sums to the central unit is only one fourth of what it would be if all antennas would be along a single chain. FIG. 9 illustrates a modification, in which the central unit 901 is not directly responsible for maintaining the loop-formed data collection lines, but has four distributed controllers 911, 912, 913, and 914 at its disposal. These may act as the distributed-domain "central units" for any number of data collection lines of any form and configuration; as an example the distributed controllers 911 and 912 each have one data collection line, while the distributed controllers 913 and 914 each have two.

Figure 10:
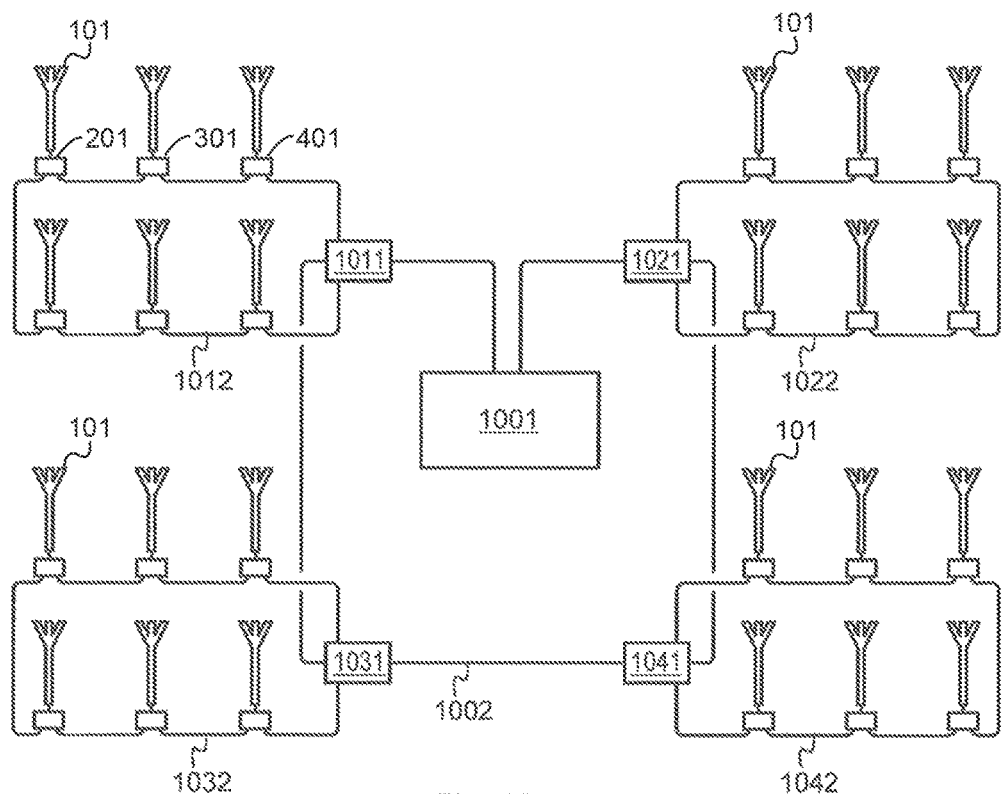
FIG. 10 illustrates yet another way of arranging data collection lines.

FIG. 10 illustrates an example of a hierarchical data collection structure where data collection lines are used on different hierarchical levels. Antenna units are chained along first-level data collection lines, each of which begins and ends at a distributed controller; for example data collection line 1012 begins and ends at the distributed controller 1011. Second-level data collection line 1002 begins and ends at the central unit 1001, and connects together the distributed controllers 1011, 1021, 1031, and 1041. First-level sums of delayed digitized measurement data are formed in the distributed controllers, and they can in turn accumulate a second-level sum in a data collection frame that circulates along the second-level data collection line 1002.

Loop-formed data collection lines have been illustrated in FIGS. 8, 9, and 10, but any or all of the illustrated data collection lines could also be one-directional as in the example of FIG. 2 earlier.

Figure 11:
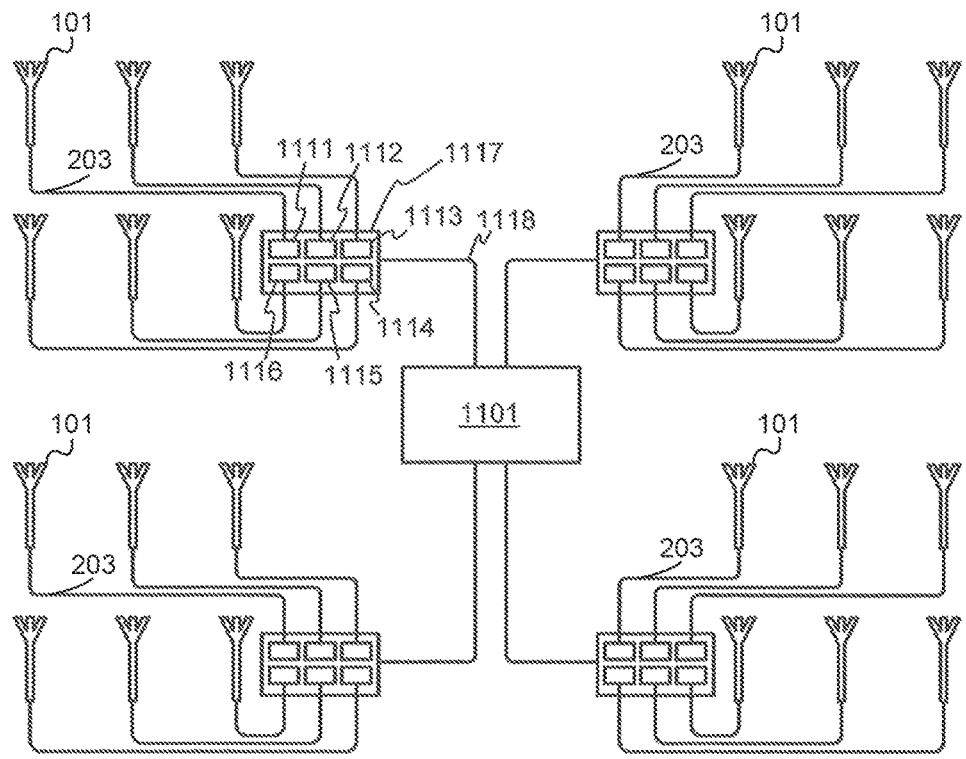
FIG. 11 illustrates yet another way of arranging data collection lines.

The invention does not require placing the antenna units into the immediate vicinity of the antennas; in some embodiments of the invention the physical distance between consecutive antenna units along the data collection line may be even significantly smaller than the physical distance between an antenna unit and the antenna(s) from which it receives the measurement signal. FIG. 11 illustrates an embodiment in which a number of antenna units are grouped together. Antenna units 1111, 1112, 1113, 1114, 1115, and 1116 may be for example circuit boards or plug-in units in a rack 1117. The data collection line that chains the antenna units together may be implemented utilizing the rack's backplane bus communication facilities, like a PCI bus (Peripheral Controller Interconnect) or a PXI bus (PCI eXtensions for Instrumentation) (not separately shown in FIG. 11) and a connection 1118 to the central unit 1101.

An embodiment of the kind illustrated in FIG. 11 could be utilized for example in the so-called EISCAT3D framework. One rack could handle the measurement signals from an antenna group consisting of dozens of antennas, like between 48 and 128 antennas, and there could be dozens or hundreds of such antenna groups, like between 100 and 400 antenna groups. The connections between the racks and the central unit 1101 may be for example 10 Gbit/s Ethernet connections or other sufficiently fast connections.

Depending on how far the racks can be placed from the central unit, the reduction in the amount of radio frequency cabling (i.e. cabling between antennas and antenna units) that can be achieved in an embodiment like that in FIG. 11 may not be as large as e.g. in an embodiment like that in FIG. 8. However, many other advantages that are typical to embodiments of the invention are still achieved. A major part of the calculating, particularly the delaying required for beam forming and the summing of the appropriately delayed signals, is accomplished in the distributed domain. The relatively limited data bandwidth of a typical backplane bus communication facility of a rack, like a PXI bus for example, could constitute a bottleneck if chaining of antenna units and summing with pre-existing data in the antenna units as described above were not used.

Figure 12:
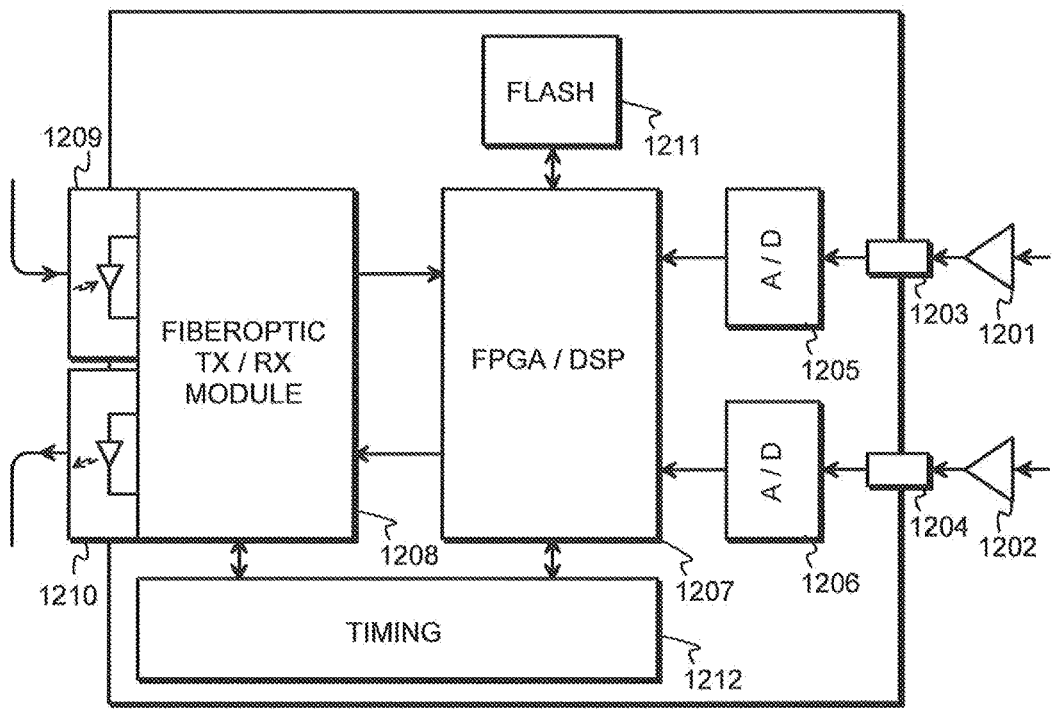
FIG. 12 illustrates an example of components of an antenna unit.

FIG. 12 illustrates a division into functional components of an exemplary antenna unit. Measurement signal inputs to the antenna unit come from the right through low-noise preamplifiers 1201 and 1202 and input connectors 1203 and 1204. Analog to digital converters 1205 and 1206 convert the measurement signals to digital at a high conversion rate, like 105 megasamples per second, and feed them to the processing unit 1207, which may be for example an FPGA (Field Programmable Gate Array) or a DSP (Digital Signal Processor). The processing unit 1207 implements all the filtering, delaying, weighting and summing functions that have been described above.

On the side of the data collection line is a fiberoptic transmission and reception module 1208, which constitutes the connection through the data collection line through an optical receiver 1209 and an optical transmitter 1210. We assume that the data collection line is implemented with fiber optics. The coupling between the fiberoptic transmission and reception module 1208 and the processing unit 1207 is bidirectional for conveying the pre-existing data read from the received data collection frame to the processing unit, and for conveying the calculated sum from the processing unit to the fiberoptic transmission and reception module. A nonvolatile memory, such as a flash memory 1211, is used to store control information and firmware for the processing unit 1207. A timing unit 1212 comprises a clock signal generator that may rely upon a local crystal oscillator and/or on detected arrival times of data collection frames or other timing indicators contained in or otherwise associated with the data collection frames.

Figure 13:
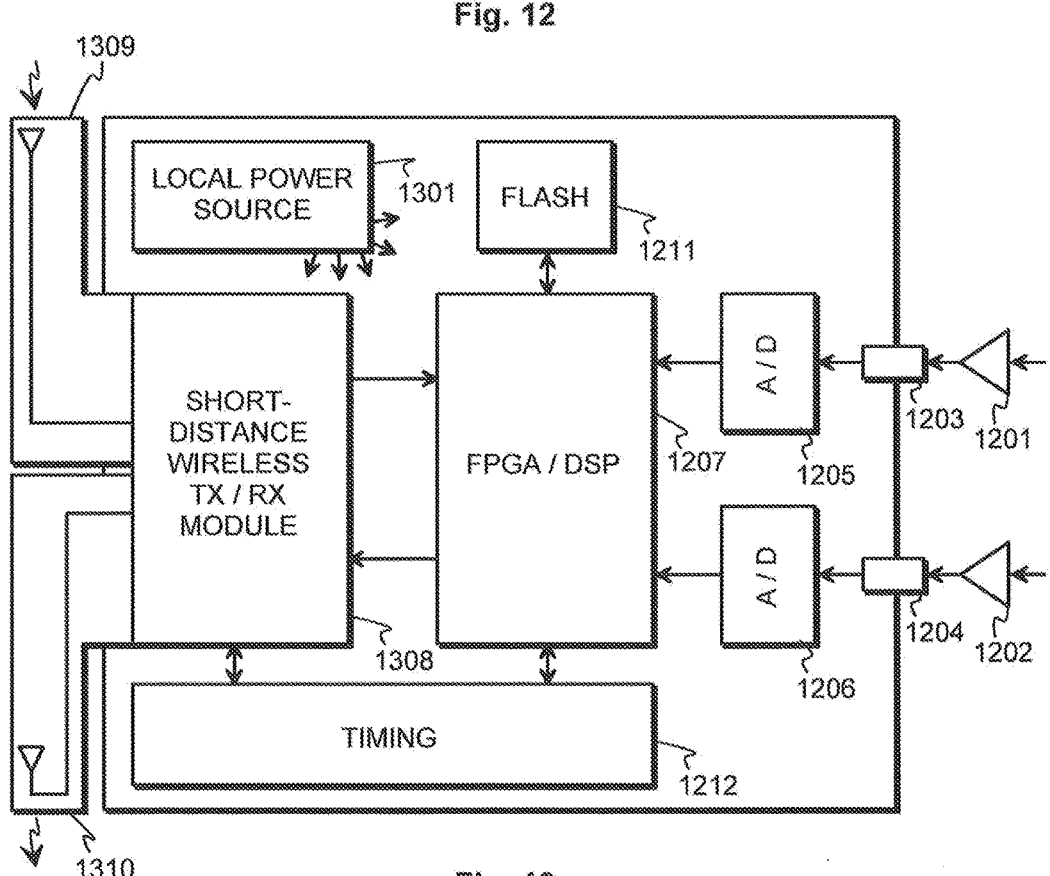
FIG. 13 illustrates an example of components of another antenna unit.

FIG. 13 illustrates an antenna unit that has some differences to that of FIG. 12 concerning both operating power and the communications with other antenna units. In FIG. 12 we simply assumed that the operating power to the various functional blocks comes in some known way, for example through a power cable from a power distribution system, so no graphical representation of the operating power needed to be separately shown. In FIG. 13 the antenna unit comprises a local power source 1301, which is configured to supply at least some of the other functional blocks with electric power. The local power source 1301 may comprise for example a solar panel and a rechargeable battery, which is an advantageous choice if the antenna arrangement is located in a place where sufficient solar power is available. We may assume that the power consumption of an antenna unit described above could be in the order of a few watts, like in the order of 5 watts. If regular sunshine can be relied upon, which charges the battery full each day, a battery with useful electric storage capacity in the order of 100 Wh (watt-hours) would be sufficient. Taken the solar panel technology at the time of writing this description, and assuming that regular sunshine is available at least five hours each day, a solar panel of about 40×40 cm could be sufficient for fully recharging the 100 Wh battery each day.

For communicating with other antenna units, i.e. for receiving and transmitting data collection frames, the antenna unit of FIG. 13 comprises a short-distance wireless transmission and reception (TX/RX) module 1308, as well as at least two short-distance wireless transmission interfaces 1309 and 1310. If the distance between the wireless transmission interfaces of adjacent antenna units is relatively short, like in the order between some centimeters and some meters, the transmission power required to convey data collection frames in wireless transmissions between antenna units may be very low, and the transmission and reception antennas used in the wireless transmission interfaces may be very small. The short-distance wireless transmission interfaces 1309 and 1310 may be implemented for example with WiFi-technology. At the time of writing this description a WiFi connection with a 5 GHz carrier frequency may achieve data transmission rates in the order of 450 Mbit/s. Dipole antennas used for such WiFi connections need not be larger than some centimeters across.

The low requirements of transmission power also mean that transmissions between one pair of adjacent antenna units represent significant interference power for only some of the closest other pairs of antenna units. Further away the interfering effect is not that significant any more, which means that a wireless communication channel can be re-used even only a relatively short distance away. This is a significant advantage, because otherwise a shortage of useful wireless communication channels could result in a very large antenna arrangement. The interference caused to other pairs of adjacent antenna elements can also be reduced by using directional antennas for short-distance wireless transmission and/or reception.

Figure 14:
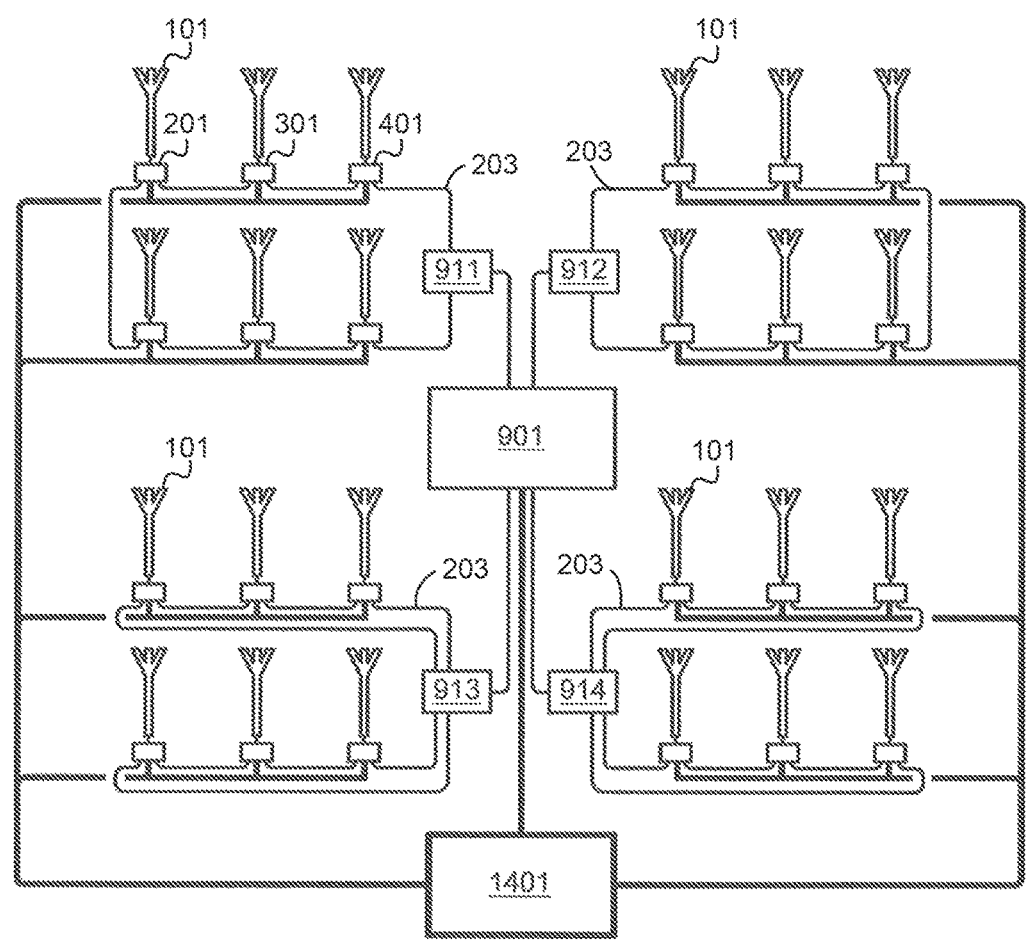
FIG. 14 illustrates an example of using dedicated connections for operating power.

FIG. 14 is a graphical illustration of the principle that the connections used for data collection can be (although they need not be) completely separate from the cabling (if any) used to distribute operating power. This principle is illustrated in FIG. 14 using the antenna arrangement previously shown in FIG. 9 as a basis, but the same principle is equally applicable regardless of how the data collection connections are arranged (see e.g. FIGS. 8, 10, and 11). In the antenna arrangement of FIG. 14 a central power source 1401 may be located even at a completely different location than the central unit 901 that constitutes the concentration point of the data collection lines.

Figure 15:
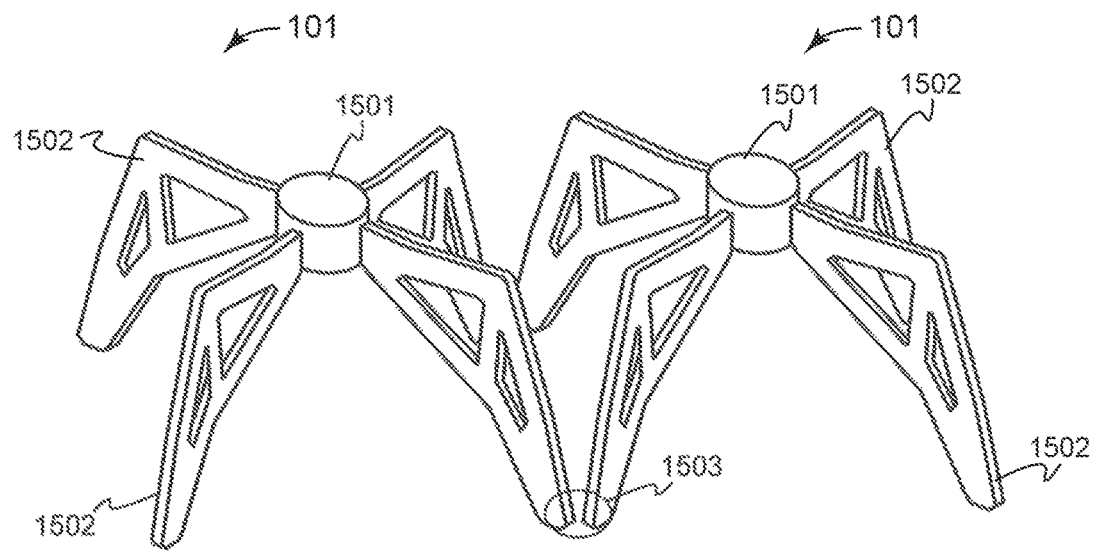
FIG. 15 illustrates an example of movable, possibly wireless antenna structures.

FIG. 15 illustrates an example of how two adjacent antenna structures could look like, especially if the antenna arrangement is aimed to be physically reconfigurable. The last-mentioned means that the number of antennas in the antenna arrangement can be changed, and/or the location of individual antennas in relation to each other can be changed. In the embodiment of FIG. 15 an antenna structure comprises a container 1501 for the electronics, as well as a support structure which in this example takes the form of four legs 1502 that support the container 1501 at a suitable height above the ground. The antenna may be located inside the container 1501, or the support structure may support an antenna outside the container 1501. For example, branches of a dipole antenna could run along the top edges of at least some of the legs 1502 in FIG. 15. Moreover, the form of the legs 1502 themselves is such that they themselves can work as wide band antennas. In fact, this kind of construction is used in the LOFAR radio telescope antenna elements, in which context the geometrical shape of the antenna construction is referred to a slanted bowtie antenna shape. The slanted bowtie shape of the dipole wings makes the antenna bandwidth as wide and slanting the wings down makes the beam form also wide-angled, which is suitable for observations close to horizon. Informally, this form of an antenna can be also called as "a spider antenna". Two opposite wings or legs 1502 of the structure form a single dipole antenna with a certain polarization. The other two legs locating in orthogonal direction compared to the ones above, form another antenna beam with a polarization in orthogonal direction. Therefore, we may say that a four-legged spider antenna contributes to two different antenna beams which have two mutually orthogonal polarization directions. On the other hand, we may say that the given antenna structure creates a single antenna beam with a dual polarization pattern.

A support structure that extends relatively far from the container 1501 is advantageous for many reasons. For example, it gives good mechanical stability, so that the antenna structure may stand high winds even if it is not fixedly attached to the ground. Also it may result in a situation where parts of the support structures of two adjacent antenna structures come relatively close to each other, like at the location shown as 1503 in FIG. 15. If short-distance wireless transmission is to be used for communications between antenna units, the location 1503 is ideal for placing the short-distance wireless interfaces, because the wireless connection only has to extend across a relatively short distance. The largest dimension of an antenna structure like that in FIG. 15, i.e. the distance between the distant ends of opposite legs, may be in the order of one meter or some meters.

Figure 16:
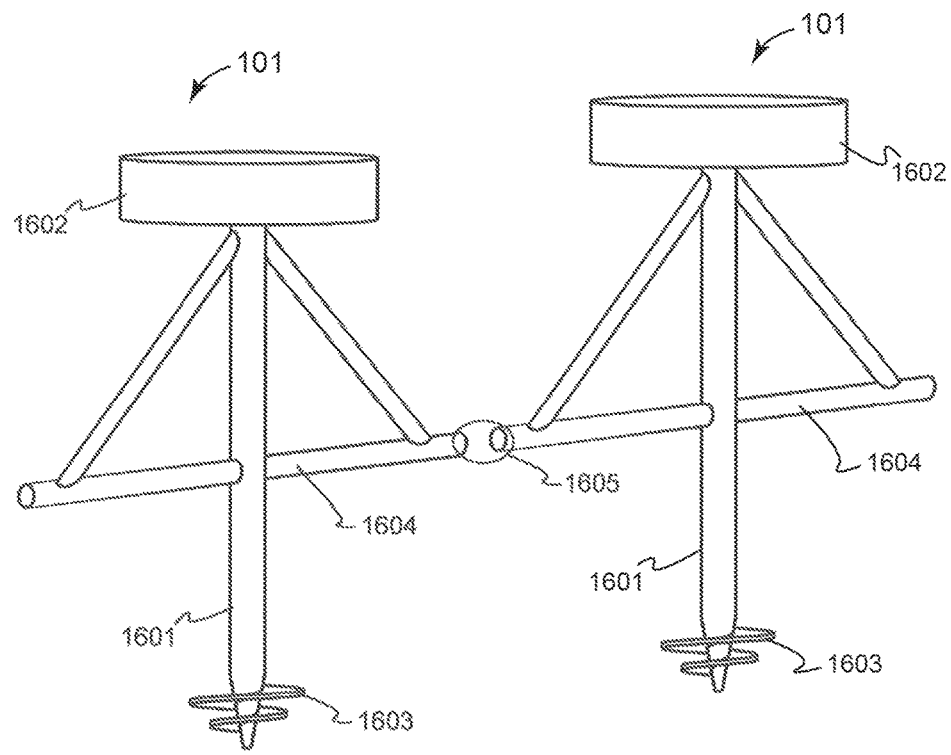
FIG. 16 illustrates an example of antenna structures built with stilts.

FIG. 16 illustrates another example of two adjacent antenna structures for use in an antenna arrangement which can be informally called as "a screwpile antenna". An antenna structure according to FIG. 16 comprises a stilt 1601, which supports a container 1602 for an antenna and electronics at its top end. A coarse spiral thread 1603 at the lower, sharp end of the stilt 1601 enables attaching the antenna structure to the ground simply by turning it like a giant screw. Radial spars 1604 extend to the sides of the stilt 1601. If they are sturdy enough, they can be used as handles in turning the antenna structure, and/or properly aligned they may create the locations 1605 where it is particularly easy to arrange the short-distance wireless communications between the antenna elements of two adjacent antenna structures. If wired connections are used, the radial spars 1604 or similar structural elements may be used to support the wires, so that the wires (and possible power cables) only need to hop across a relatively short gap unsupported at location 1605. Moreover, the radial spars 1604 may also as themselves constitute dipole antenna branches.

Figure 17:
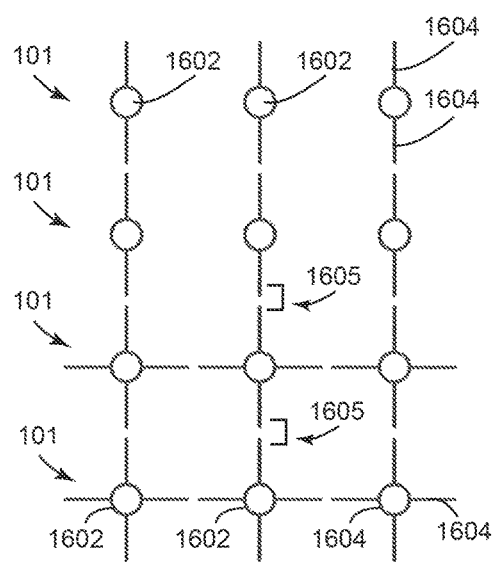
FIG. 17 illustrates an example of arranging antenna structures.

FIG. 17 is a schematic top view of a part of an antenna arrangement that is built with antenna structures following the structural principle of FIG. 16. FIG. 17 also illustrates the possibility that not all chains of antenna units need to be strictly one-dimensional in the logical sense. In other words, the circulation of data collection frames may comprise branching points. In the top half of FIG. 17 each antenna structure comprises two radial spars extending to opposite sides, so that short-distance wireless communications or radial-spar-supported wired connections go in the direction that is vertical in FIG. 17. In the lower half of FIG. 17 each antenna structure comprises four radial spars extending to directions spaced 90 degrees apart, so that short-distance wireless communications or radial-spar-supported wired connections may go in horizontal and/or vertical directions in FIG. 17.

Figure 18:
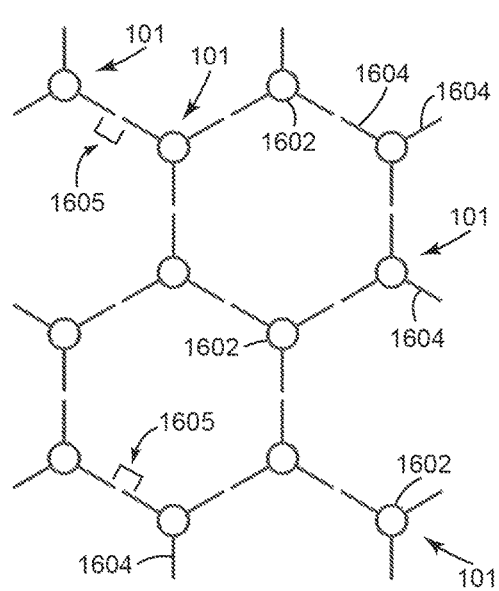
FIG. 18 illustrates another example of arranging antenna structures.

FIG. 18 illustrates the fact that the antennas of an antenna arrangement need not be at the vertices of a square matrix. The antennas of the antenna arrangement in FIG. 18 are at the vertices of a hexagonal matrix. Each antenna structure comprises three radial spars extending to directions spaced 120 degrees apart. Short-distance wireless communications or radial-spar-supported wired connections may go in any directions within the hexagonal matrix in FIG. 18.

IQ Sampling and Time Delays in Antenna Units

In this section we will provide a more detailed mathematical analysis of how the filtering and delaying of signals can be accomplished in the antenna units. As background information we may recall that the Fourier transform of a (finite-energy) continuous RF signal z(t) is $$\hat{z}(\omega) = \int_{-\infty}^{\infty} e^{i\omega t} z(t) dt$$

and its inverse is $$z(t) = \frac{1}{2\pi} \int_{-\infty}^{\infty} e^{-i\omega t} \hat{z}(\omega) d\omega$$

while for a discrete time series $z_i$ the Fourier transform is a function defined on the unit circle $\omega \in [0, 2\pi)$ as $$\hat{z}(\omega) = \Sigma_{k=-\infty}^{\infty} e^{i\omega t} z_k$$

and its inverse is $$z(t) = \frac{1}{2\pi} \int_0^{2\pi} e^{-i\omega k} \hat{z}(\omega) d\omega.$$

Given these formulae, and assuming that $\hat{z}(\omega)$ is given, and also assuming that $\hat{z}(\omega)=0$, if $\omega<0$ or $\omega \geq 2\pi$, we deduce that $z_k = z(k)$ for every integer k. This is the simplest version of the Shannon sampling theorem that says that if the Fourier transform of a continuous signal is non-zero only on the interval $[0, 2\pi)$, the signal is completely determined by its values at integer points only.

Even if we drop the assumption about the spectrum $\hat{z}(\omega)$ of the continuous signal being limited to $[0, 2\pi)$, the continuous signal at integer points (like at all other points) is still given by the inverse Fourier transform $$z(k) = \frac{1}{2\pi} \int_{-\infty}^{\infty} e^{-ik\omega} \hat{z}(\omega) d\omega.$$

Let us now consider the integrand on the interval $\omega \in [n, n+2\pi)$. By transform of variable $\omega' = \omega - n2\pi$ we get $$\int_{n2\pi}^{(n+1)2\pi} e^{-ik\omega} \hat{z}(\omega) d\omega = \int_0^{2\pi} e^{-ik\omega' + ikn2\pi} \hat{z}(\omega') d\omega' = \int_0^{2\pi} e^{-ik\omega'} \hat{z}(\omega') d\omega'$$

and as the double infinite integral is the sum of all these integrals over n, we can write $$z(k) = \frac{1}{2\pi} \int_{-\infty}^{\infty} e^{-ik\omega} \hat{z}(\omega) d\omega =$$

$$\frac{1}{2\pi} \int_0^{2\pi} e^{-ik\omega} \sum_{n=-\infty}^{\infty} \hat{z}(\omega - n2\pi) d\omega = \frac{1}{2\pi} \int_{-\infty}^{\infty} e^{-ik\omega} \hat{z}^a(\omega) d\omega$$

where we have defined the aliased spectrum $\hat{z}^a(\omega)$ as $$\hat{z}^a(\omega) = \sum_{n=-\infty}^{\infty} \hat{z}(\omega - n2\pi).$$

Here we have defined the more general relationship between the spectrum of the continuous signal z(t) and the discrete signal $z_k = z(k)$, which is defined as the values of the continuous signal at integer time values. The discrete Fourier transform of the discrete signal can be obtained from the Fourier transform of the continuous signal by aliasing the continuous signal modulo $2\pi$ in its argument and summing all the aliased signals together.

We may now state the Shannon sampling theorem in a more general form. If the Fourier transform of a continuous signal z(t) is non-zero only on some interval $[\omega_0, \omega_0 + 2\pi)$, the signal is completely determined by its values at integer points only z(k), k= . . . , −2, −1, 0, 1, 2, . . . .

In most cases the original signal is real. Its Fourier transform has then a symmetric real part and an asymmetric imaginary part. Usually not the whole continuous range of positive and negative frequencies is considered, but on both sides the support of the Fourier transform is taken to concentrate around a center frequency or carrier frequency $\pm\omega_0$. As a basic definition we may assume that the signal spectrum is limited into a limited band $\Delta\omega$ around a center frequency $\omega_0$ (with $\Delta\omega/2 \le \omega_0$). The unshifted IQ signal is defined as $$z^{iq}(t) = \frac{1}{2\pi} \int_0^\infty e^{-i\omega t} \hat{z}(\omega) d\omega = \frac{1}{2\pi} \int_{\omega_0-\Delta\omega/2}^{\omega_0+\Delta\omega/2} e^{-i\omega t} \hat{z}(\omega) d\omega$$

and the DC shifted IQ signal as $$z^{DC}(t) = e^{i\omega_0 t} z^{iq}(t) = \frac{1}{2\pi} \int_0^\infty e^{i(\omega_0-\omega)t} \hat{z}(\omega) d\omega =$$

$$\frac{1}{2\pi} \int_{\omega_0-\Delta\omega/2}^{\omega_0+\Delta\omega/2} e^{i(\omega_0-\omega)t} \hat{z}(\omega) d\omega = \frac{1}{2\pi} \int_{-\Delta\omega/2}^{\Delta\omega/2} e^{-i\omega t} \hat{z}(\omega + \omega_0) d\omega$$

It is clear that either one of the IQ signals uniquely determines the signal z(t) back again, if necessary.

Usually the DC shifted IQ signal is the signal one is interested in for further processing. However, its relationship to the original signal is not time-shift invariant (because of the multiplication with $e^{i\omega_0 t}$). On the other hand, the unshifted IQ signal is just a filtering result of the original signal (as its Fourier transform can be obtained by multiplication from the original signal's Fourier transform). It is often beneficial to be able to use simple filters in signal processing, and for this reason some practical signal processing solutions actually first produce the unshifted IQ signal.

Sampling the RF signal is a key operation in digital signal processing. To avoid redundancy and associated costs of unnecessarily high sampling rates, it is usually considered advantageous to sample the signal in such a way that only one of the mirror image components is present in the samples taken forward to digital processing.

In the discussions above we have assumed discrete samples to correspond to values of the continuous signals at integer points. For further discussions we need to be able to discuss a more flexible choice of sampling frequencies. Thus we define a sampling frequency $f_s$ to define our sampling points.

Let us redefine our discretized signal, taking the sampling frequency into account. Let us denote the sample interval with $\Delta t$, so that the sampling frequency is $f_s=1/\Delta t$. The Fourier transform and inverse transform formulae were given above for continuous signals. The discrete Fourier transform $\hat{z}_{\Delta t}(\omega)$ of the sampled signal $z_k=z(k\Delta t)$ is $$\hat{z}_{\Delta t}(\omega) = \sum_{k=-\infty}^{\infty} e^{i\omega k} z(k\Delta t) = \sum_{k=-\infty}^{\infty} e^{i\omega k} \frac{1}{2\pi} \int_{-\infty}^{\infty} e^{-i\omega' k \Delta t} \hat{z}(\omega') d\omega' =$$

$$\int_{-\infty}^{\infty} \sum_{n=-\infty}^{\infty} \delta(\omega - \omega' \Delta t + n 2\pi) \hat{z}(\omega') d\omega' = \frac{1}{\Delta t} \sum_{n=-\infty}^{\infty} \hat{z}\left(\frac{\omega + n 2\pi}{\Delta t}\right)$$

This formula fully describes the spectrum aliasing of sampled signals. In particular we may write $$\hat{z}_{\Delta t}(\omega) = \frac{1}{\Delta t} \hat{z}\left(\frac{\omega}{\Delta t}\right), \text{ if } -\pi \le \omega \le \pi \text{ and } \Delta f \ge \frac{1}{\Delta t}$$

The domain of the argument is important: for $\hat{z}_{\Delta t}(\omega)$ it is the unit circle $[0, 2\pi)$ because we deal with the Fourier transform of a series, and for $\hat{z}(\omega)$ it is the whole real axis, because we then deal with the Fourier transform of a continuous signal. The condition in the equation immediately above only makes sense, if we implicitly assume aliasing in $\omega$ when used as the argument of $\hat{z}_{\Delta t}(\omega)$.

We may now reformulate the sampling theorem in terms of the sampling frequency: if the Fourier transform of a continuous signal z(t) is non-zero only on some interval $[\omega_0, \omega_0+2\pi/t)$, the signal is completely determined by its values at sample points only, i.e. at z(k$\Delta$t), k= ..., −2, −1, 0, 1, 2, ....

If the actual signal is real, its Fourier transform is conjugate symmetric around the zero frequency. This makes the direct application of the sampling theorem rather difficult, as for completely determining the signal it calls for a sampling frequency that is more than two times the carrier frequency of the signal itself. This problem is often mitigated by downconverting the RF signal to an IF signal having a lower carrier frequency, but it can also be directly solved by undersampling the signal in a proper way. In the following we discuss practical IQ detection by undersampling.

Denoting the carrier frequency as $f_0$ and the bandwidth as $\Delta f$ can be expressed with mathematical accuracy as $\hat{z}(\omega)=0$, if $\omega-2\pi f_0>2\pi\Delta f/2$ and $\omega+2\pi f_0>2\pi\Delta f/2$ If the signal is sampled at a sampling frequency $f_s=1/\Delta t$, where $\Delta t$ is the sampling interval, the negative part of the spectrum is aliased at points $-f_0+nf_s$ and the positive part (its conjugate mirror image) at points $f_0-nf_s$, where $n\in(\ldots, -2, -1, 0, 1, 2, \ldots)$. The original signal is uniquely determined by the sampled signal if and only if the original spectrum is uniquely determined by the aliased spectrum.

If $f_0=nf_s$ or $f_0=(n+\frac{1}{2})f_s$ for some integer n, the sampled signal does not uniquely determine the original signal, as the positive and negative parts are just summed up together aliased around zero frequency (or around $\pi$ on the unit circle) and we cannot uniquely determine either one from that sum.

On the other hand, if $f_0=(n+\frac{1}{4})f_s$, the positive carrier $f_0$ is aliased at $\pi/2$ on the unit circle and the negative carrier at $-\pi/2$. Assuming $\Delta f < -f_s/2$, the width of each of those parts around their centre point is at most $\pm\pi/2$ and they do not sum up together in the alias sum at all. A similar advantageous situation happens if $f_0=(n-\frac{1}{4})f_s$, because then the positive carrier is aliased at $-\pi/2$ and the negative at $\pi/2$ and again they are as far as possible from each other on the unit circle. Uniqueness can also be accomplished at all other sampling frequencies at which $f_0$ is not an integer or integer-and-half times $f_s$, but then the bandwidth of the signal must be less than $f_s/2$.

The considerations above can be formulated into the following theorem: let us assume that a sampling frequency $f_s$ is used to sample a real signal, the spectrum of which is constrained by $\pm f_0 \pm \Delta f/2$. The original signal can be uniquely determined from the samples if (and only if) $\Delta f < 2 \cdot \min_{n \in Z} |nf_s/2 - f_0|$. The proof of this theorem comes from the requirement that the positive and negative spectrum supports must not overlap in the alias sum.

One example is a sampling frequency $f_s$ of 80 MHz multiplied with 3-¼ to produce a centre frequency and maximum useable band of $f_0 \pm \Delta f/2 = 220 \pm 20$ MHz. This a good choice for example for sampling the EISCAT 224 MHz VHF frequency (although an even better choice would be $f_s$ of 100 MHz multiplied with 2+¼ to produce a centre frequency and maximum useable band of $f_0 \pm \Delta f/2 = 225 \pm 25$ MHz).

For simplicity we assume that the sampling frequency $f_s$ and the carrier (center-of-band) frequency $f_0$ follow the ideal relationship $f_0 = (n - ¼)f_s$. This choice is made for clarity of explanation only, and the considerations may be generalized to other choices for example by redefining $f_0$ to be the closed ideal center-of-band carrier frequency corresponding to $f_s$.

Exact samples of non-shifted IQ signal are obtained by the inverse Fourier transform of $\chi_{[0,\pi)}(\omega)\hat{z}_{\Delta f}(\omega)$ or the other sideband $\chi_{[-\pi,0)}(\omega)\hat{z}_{\Delta f}(\omega)$. Since the Fourier transforms are defined on the unit circle, the last function is equal to $\chi_{[\pi,2\pi)}(\omega)\hat{z}_{\Delta f}$. With the ideal relationship between the carrier $f_0$ and the sampling frequency $f_s$ the carrier is not aliased to 0, but to $\pi/2$ or $-\pi/2$, depending on whether the ¼ was added to or subtracted from the integer multiplier n. The DC shifted IQ signal is then obtained from the series by multiplication with $(-i)^k$ or $i^k$.

In either case, the IQ signals obtained are sampled at an unnecessarily high frequency $2\Delta f$. We can save storage space and communication bandwidth by omitting every second point of the signal. Also this decimated-by-two sample stream uniquely determines the original signal. If this decimation is first done to the unshifted IQ samples, the DC shifted samples are obtained from these through multiplication with $(-1)^k$.

Multiplication of the Fourier transform of a series by a weight function like $\chi_{[0,\pi)}(\omega)\hat{z}_{\Delta f}(\omega)$ is the same as convolution of the series with a kernel whose Fourier transform is the weight. The inverse Fourier transform of $\hat{W}(\omega) = \omega_{[0,\pi)}(\omega)$ is given by $$W_k = \begin{cases} 1/2, & \text{if } k = 0 \\ 0, & \text{if } k \text{ even}, k \neq 0 \\ i/k\pi, & k \text{ odd} \end{cases}$$

We may summarize teachings in this section so far by pointing out that the unshifted IQ signal (with carrier aliased at $f_s/4$ or $-f_s/4$) can be obtained from the signal samples by filtering with coefficients given above. The result can be decimated by 2, after which the filter for the real part is just a multiplication by ½ on every second point of the original time series, and the filter for the imaginary part operates on every second point of the original time series with a filter with coefficients $i/(2k+1)\pi$, $k \in \mathbb{Z}$. The sample frequency of the decimated series is then $f_s/2$, and the DC shifted IQ series is obtained from that by multiplication by $(-1)^k$.

The samples thus obtained are exact samples of the IQ signal as originally defined above—they are no approximations. The original IQ signal as well as the original signal itself can be uniquely reconstructed from these signals only.

Defining the filter coefficients in the way discussed above may make them decay relatively slowly. This behavior results from the sharp edges of the Fourier-side mask the filter is derived from. If $\Delta f = f_s/2$ the sharp mask cannot be avoided, but in case $\Delta f < f_s/2$ we may help the situation in the following way.

Instead of the characteristic function for the positive frequency part $\chi_{[0,\pi)}(\omega)$ we can use any function $\chi_s(\omega)$ which needs to be zero or one only at those locations of the unit circle where the band actually can be aliased. Thus we only need to require that $$\chi_s(\omega) = \begin{cases} 1, & \text{if } \pi\frac{f_s/2 - \Delta f}{2} \leq \omega \leq \pi\left(1 - \frac{f_s/2 - \Delta f}{2}\right) \\ 0, & \text{if } -\pi\left(1 - \frac{f_s/2 - \Delta f}{2}\right) \leq -\omega \leq -\pi\frac{f_s/2 - \Delta f}{2} \end{cases}$$

This is enough to guarantee that the IQ samples still determine the original signal uniquely. In the intervals $$\left(-\pi\frac{f_s/2 - \Delta f}{2}, \pi\frac{f_s/2 - \Delta f}{2}\right) \text{ and } \left(\pi\left(1 - \frac{f_s/2 - \Delta f}{2}\right), -\pi\left(1 - \frac{f_s/2 - \Delta f}{2}\right)\right)$$

we can define a replacement function $\psi(\omega)$ that is a smooth, even infinitely differentiable function. Note that in the definition of the latter interval we assume that it aliases from $+\pi$ to $-\pi$. This will cause the filter coefficients to decay sufficiently fast, in fact faster than any power.

An infinitely smooth mollifier function or ramp function can be constructed, which can replace the above-mentioned, possibly problematic sharp steps in the characteristic function $\chi_{[0,2\pi)}(\omega)$ Of the positive half of the unit circle. For this we need smooth functions defined on intervals of length $\pi(f_s/2 - \Delta f)$, being equal to 0 at one end and equal to 1 at the other end.

We can start the construction by noticing that the function $$f(x) = \begin{cases} e^{-1/x}, & \text{if } x > 0 \\ 0, & \text{if } x \leq 0 \end{cases}$$

is everywhere infinitely differentiable, and so is the function $$f_a(x) = \begin{cases} e^{-a/x}e^{-a/(1-x)} = e^{\frac{-a}{x(1-x)}}, & \text{if } x > 0 \text{ and } x < 1 \\ 0, & \text{if } x \leq 0 \text{ or } x \geq 1 \end{cases}$$

We get the ramp function $\psi_a(x)$ that has the desired properties by first defining its derivative as $$\psi'_a(x) = f_a(x)/\int_{-\infty}^{\infty} f_a(x)dx$$

and then the ramp function itself by $$\psi_a(x) = \int_{-\infty}^{x} \psi'_a(t)dt$$

Next we will consider some applications of Fourier transforms in practice. The Fourier transform of a time series is a complex-valued function defined on the unit circle $\omega \in [0, 2\pi)$. Numerical approximations can be effectively calculated with the discrete Fourier transform (DFT) or with the known fast algorithms (fast Fourier transform, FFT) for getting the same results. The Fourier transform of a time series $z_k$ is usually denoted by $\hat{z}(\omega)$ and we can thus denote the discrete Fourier transform by subscripting $\hat{z}_k$. The DFT (or FFT) and the inverse transform with N points are given by $$\hat{z}_p = \sum_{k=0}^{N-1} e^{i2\pi kp} z_k \text{ and } z_k = \frac{1}{N}\sum_{p=0}^{N-1} e^{-i2\pi kp} \hat{z}_p$$

It is useful to write, as a reminder, here also the definitions $$\hat{z}(\omega) = \sum_{k=-\infty}^{\infty} e^{i\omega t} z_k \text{ and } z_k = \frac{1}{2\pi} \int_0^{2\pi} e^{-i\omega t} \hat{z}(\omega) d\omega$$

In the discrete transform the indices p should be understood as points distributed uniformly on the unit circle. In particular, if the time series is totally contained in the samples $(z_0, z_1, \ldots, z_{N-1})$, we have the exact correspondence:

$$\hat{z}_p = \hat{z}(p2\pi/N), 0 \le p \le N$$

Actually the condition $0 \le p \le N$ is superficial, if we remember the convention that all expressions regarding p implicitly imply them being modulo N and all statements regarding the frequency arguments of Fourier transforms of series are modulo $2\pi$.

If we use discrete Fourier transforms to represent pieces of time series longer than N, the relationship between the Fourier transform and the discrete Fourier transform is not exact. In spite of this the discrete Fourier transform can be used as an accurate tool in various calculations by doing the chopping of the longer time series more carefully, using the ramp functions defined earlier in this text.

We have chosen to use angular frequency $\omega$ as the argument on the unit circle for the Fourier transform of discrete time series. We feel it is a good choice, because then from the limits $[0, 2\pi)$ it is immediately clear that we talk about the transform of discrete series. Moreover, half of the full circle is $\pi$ and one quarter is $\pi/2$, so these frequencies are immediately recognized. DFT is often used as an approximation for the Fourier transform. Then it is useful to remember the following correspondences:

In the inverse transform formula we normalize by $2\pi$ and in the discrete formula by N. This can be helpful as a tool for remembering the correct normalization.

The zero frequency is usually the first point of the result vector from any numerical algorithm for DFT.

The negative frequencies appear at the end of the vector.

In the following we have compiled a table which shows the relationship of the various frequency arguments to each other. We have assumed a DC shifted IQ signal, sampled at the frequency $f_s$, and N points in the discrete Fourier transforms. In this table we assume N is even.

frequency axis is then on the left side of the plots and negative frequencies appear on the right side. This emphasizes the fact that we really are talking of the unit circle and this may help in understanding the aliasing features.

While the sampled IQ signals represent exact values of the theoretical signal, it may be somewhat tricky to see the relationship of the IQ signal to the original one. This is especially true in terms of time behavior in the scale determined by the carrier frequency. The reason for this is the possibly multiple aliasing of the carrier, and the remedy is to remember the factorization:

$$z^{iq}(t) = e^{-i\omega_0 t} z^{DC}(t)$$

The spectrum of the DC shifted IQ signal $z^{DC}(t)$ is centered around the origin, and we assume our sampling frequency to be higher than the width of this spectrum. Usually the sample frequency of this signal is chosen as low as conveniently possible so that it contains all the signal bandwidth, but does not produce unnecessarily many samples. It follows that we do not have worry about aliasing regarding this signal at all.

Aliasing is then explained by the exponential term in the factorization. It is important to note that while summation commutes with either of the operations: unshifted IQ and DC shifted IQ detection, time delays only commute with unshifted IQ detection. So—for example when calculating time shifts for example for phased array beamforming—we must do this with the unshifted IQ signal.

For example, let us assume the DC shifted IQ has been sampled at a frequency $f_s = 1/\Delta t$ and that we need the value of the signal at time instances $p\Delta t + r\Delta t$, where $|r| \le \frac{1}{2}$. An approximate way to get the values is to use $$z^{iq}(t) = e^{-i\omega_0 p\Delta t} e^{-i\omega_0 \Delta t} z^{DC}(p\Delta t + \tau\Delta t) \approx e^{-i\omega_0 p\Delta t} e^{-i\omega_0 \tau} z^{DC}(p\Delta t)$$

If this approximation can be used, the time shift is then explained by the complex factors $e^{-i\omega_0 \tau}$ only. This is the way phased arrays are usually created—the time delays between the antennas are explained using phase factors related to the carrier frequency. The first exponential is common to all antennas in the array and it is not necessary to carry it around in the calculations. If the time shifts r are large enough, they may lead to different sample values $z^{DC}(p\Delta t)$ to be used for different antennas.

|   | FT of continuous signal | FT of sampled series | DFT actual frequency | vector index in C | in Fortran, R or Matlab |
|---|---|---|---|---|---|
| 1 | $\frac{\omega}{f_s} = 0 + n2\pi$ | $\omega = 0$ | $f = 0$ | $p = 0$ | $p = 1$ |
| 2 | $\frac{\omega}{f_s} \in (0, \pi] + n2\pi$ | $\omega \in (0, \pi]$ | $\frac{f_s}{N}, 2\frac{f_s}{N}, \ldots, \frac{f_s}{2}$ | $1, 2, \ldots, \frac{N}{2}$ | $2, 3, \ldots, \frac{N}{2} + 1$ |
| 3 | $\frac{\omega}{f_s} = \pm \pi + n2\pi$ | $\omega = \pm \pi$ | $f = \frac{f_s}{2}$ | $\frac{N}{2}$ | $\frac{N}{2} + 1$ |
| 4 | $\frac{\omega}{f_s} \in (-\pi, 0] + n2\pi$ | $\omega \in (-\pi, 0]$ | $-\frac{f_s}{2}, \ldots, -\frac{f_s}{N}$ | $\frac{N}{2}, \ldots, N-1$ | $\frac{N}{2} + 1, \ldots, N$ |

Concerning the expression $\omega \in (-\pi, 0]$ on the last row of the table, this is the same as $\omega \in (\pi, 2\pi]$ because all notations regarding $\omega$ are modulo $2\pi$.

In graphical plots it may be helpful to show the results of Fourier transforms so that the unit circle is represented by the horizontal axis and goes from 0 to $2\pi$. The origin of the In some cases it may not be accurate enough to approximate the signal $z^{DC}(t)$ by its closest sampled value. For these cases we need methods to create time-shifted samples of signals.

Whether to have a high sampling frequency $f_s$ and this way to be able to save in the time-shift calculations or a low sampling frequency and save rather in data bandwidths is an important design factor to be considered in phased array radar design.

As an example, we may discuss the maximum possible phase error if we use only phase corrections in summing up the signals from a small subgroup of antennas and ignore the true time-shifts in $z_{DC}(p\Delta t+t\Delta t)$. In this example we may consider practical numerical values related to the design known as the EISCAT3D.

Let us assume an extreme case of a 15 MHz off-the-centre frequency component in the DC shifted IQ signal. Also, let us assume a 0.7 m distance between the centre of the group and the antenna we want to study. This amounts to a maximum of sin(40·2π/180)*0.7/3e8=1.5 ns time difference. This is equal to 0.0225 times the cycle time of 15 MHz. Now, cos(0.0225·2·π)=0.9900, so that within a 7-antenna group we can lose at most 1% of the signal (this is about 0.3% in average).

In a 49-antenna group the distance from the centre to the furthest elements is about 3·0.7 m. So in this case the maximum loss of signal is 9% (approx. 3% in average), but ±40 degrees is highly unlikely as simultaneously generated beam directions. Also a ±15 MHz frequency spread is rather unlikely. The conclusion is that even inside the 49-antenna group the phase corrections will be quite sufficient. (As we have approximately quadratic dependence, ±20 degrees in simultaneous beam directions and ±10 MHz frequency spread will reduce said maximum of 9% back to 1% again.)

Next we will consider time-shifting the signal in more detail. Time shifts can be calculated through Fourier transforms. If, as usual, $$z_p = z(p\Delta t) = \frac{1}{2\pi} \int_0^{2\pi} e^{-i\omega p} \hat{z}(\omega) d\omega$$

then $$z_{p+\tau} = z((p+\tau)\Delta t) = \frac{1}{2\pi} \int_{-\pi}^{\pi} e^{-i\omega p} e^{-i\omega \tau} \hat{z}(\omega) d\omega$$

at least for an integer τ.

However, if the signal is properly sampled so that the Fourier transform of the continuous signal fits into the unit circle defined by the samples, this time shift formula is also (exactly) valid for non-integer time-shifts τ also. This fact can be checked by extending the integration limits to infinite instead of the unit circle.

The time shift relationship is a filter, with the Fourier transform of the filter coefficients given by $e^{-i\omega\tau}$ with ω∈[-π,π). For non-integer τ there is a discontinuity in this Fourier transform at point ±π on the unit circle, which causes the filter coefficients to decay very slowly.

However, if the bandwidth Δf of the original signal is known to be smaller than the sampling frequency $f_s$, we can freely define the Fourier transform of the coefficients on the interval $$\left(\pi - \frac{f_s - \Delta f}{2 f_s}, \pi + \frac{f_s - \Delta f}{2 f_s}\right)$$

We can use the infinitely differentiable ramp functions defined above to smoothen the discontinuity out. This way a small number of filter coefficients is enough.

The signal sampling frequency can also be changed using Fourier transforms. Let us assume that the original sampling interval is Δt, but we would rather have it sampled at intervals Δt'. We must also assume that both sampling intervals are valid regarding the original signal bandwidth: $1/\Delta t \leq f_s$ and $1/\Delta t' \leq f_s$. Then we can get the resampled signal as $$z'_p = z(p\Delta t') = \frac{1}{2\pi} \int_{-\pi}^{\pi} e^{-i\omega p} \hat{z}_{\Delta t'}(\omega) d\omega = \frac{1}{2\pi} \int_{-\infty}^{\infty} e^{-i\omega p} \frac{1}{\Delta t'} \hat{z}\left(\omega \frac{1}{\Delta t'}\right) d\omega$$

Also, as the original signal is given by $$z_p = z(p\Delta t) = \frac{1}{2\pi} \int_{-\pi}^{\pi} e^{-i\omega p} \hat{z}_{\Delta t}(\omega) d\omega = \frac{1}{2\pi} \int_{-\infty}^{\infty} e^{-i\omega p} \frac{1}{\Delta t} \hat{z}\left(\omega \frac{1}{\Delta t}\right) d\omega$$

it follows that $$\hat{z}\left(\frac{\omega}{\Delta t}\right) = \Delta t \hat{z}_{\Delta t}(\omega)$$

and thus $$\hat{z}\left(\frac{\omega}{\Delta t'}\right) = \Delta t \hat{z}_{\Delta t}\left(\omega \frac{\Delta t}{\Delta t'}\right)$$

giving us the result $$z'_p = z(p\Delta t') = \frac{\Delta t}{\Delta t'} \frac{1}{2\pi} \int_{-\infty}^{\infty} e^{-i\omega p} \hat{z}_{\Delta t}\left(\omega \frac{\Delta t}{\Delta t'}\right) d\omega =$$

$$\frac{\Delta t}{\Delta t'} \frac{1}{2\pi} \int_{-\pi}^{\pi} e^{-i\omega p} \frac{1}{\Delta t'} \hat{z}_{\Delta t}\left(\omega \frac{\Delta t}{\Delta t'}\right) d\omega$$

The result shows that the signal can be resampled by scaling the argument of its Fourier transform. Our conditions guarantee that the support will always remain within the unit circle with no aliasing.

In practice, Fourier transforms are often calculated by using their DFT/FFT approximation. As the length of the transform determines the number of points sampled from the unit circle, we get the scaling of the spectrum done either by padding zeroes in the signal and also in the transform. Then an inverse transform will give us the resampled signal. This way we can accomplish resampling by any rational numbers (effectively if we only use ratios which do not contain large primes, acting fast in FFT algorithms).

Data bandwidth is a key bottleneck in calculation of beamforming sums in a large array. For this reason it may useful to downsample the signal to a bandwidth as small as possible. Downsampling can be accomplished simply by summing up N consecutive values and only keeping the sums (integrator comb filter) or by limiting the bandwidth in the Fourier side with a smooth window function and decimating the result.

While downsampling the signal will be an essential part of the final algorithms, initial benchmarking studies can be done with full bandwidth—to guarantee that this can also be done. Downsampling can then be used to increase for example the number in simultaneous beams from the benchmarking goal of 5 to much more—even maybe tens or hundreds.

While filter solutions for the various signal processing tasks may be easier to implement with hardware or FPGA firmware, DFT and its fast FFT implementation are generally the most versatile tools for software based solutions.

We have derived the filter based solutions for the signal processing operations using Fourier transforms of the signal. Numerical versions of the solutions can then of course simply be implemented directly by replacing the mathematical Fourier transforms by their DFT/FFT approximations. The actual implementation may also involve chopping the time series into pieces providing best throughput with the actual FFT algorithms available. The infinitely smooth ramp functions $\psi_a$ are obviously a very useful tool in this process to avoid any "ringing" effects. Any estimation of filter lengths also serves as an estimate of the length of the "ringing" effects in this chopping process.

Whether to do this or whether to use filters may depend on the computational hardware available. In general it is has been considered very complicated to do DFT:s in FPGA hardware, while with computers either alternative can be implemented equally easily.

The choice will then mainly depend on computational cost of respective methods. The cost of a filter in terms of required computing operations is directly proportional to the product of the filter length and the data length, while the cost of the Fourier transform is proportional to $6N \log_2(N)$, if N is the data length. Thus, if the number of taps in the filter is denoted by $N_{tap}$, the number of operations for each data point is $4N_{tap}$ for real filters and $8N_{tap}$ for complex filters. For a Fourier transform of length 1024, the number of operations for each data point is 80 and for a transform of length $1024^2$ it is 120. In terms of operations (additions and multiplications) a Fourier transform seems to beat filter solutions already with rather small number of taps, between 8 and 30, depending on whether the filter is real and on the length of the transform used.

In general, a Fourier transform solution needs the inverse transform to be performed on the operated transform result, but in many cases—like beamforming sums—we can operate directly with the transforms and transform back only after the result is ready. For this reason it is often necessary to count only one transform when making these estimates.

In order to analyze the minimum requirements for a processing system used for beamforming, we may first recall some formulations. The problem itself is easy to understand: depending on the direction of the beam, each antenna q has a different relative time delay $\tau_q$. Constructive interference is obtained in the desired direction by calculating the sum $$z(t) = \sum_{q=1}^{N_{ant}} z_q(t+\tau_q)$$

where $N_{ant}$ is the number of antennas used for the beamforming. The problems remain in arranging the delay calculations from sampled data as well as collecting the signals from the wide antenna field for the sum to be calculated. In prior art solutions this was the task of the central computer situated on the field.

Let us now remember the factorization of the signals to the carrier part and to the IQ part:

$$z^{iq}(t) = e^{-i\omega_0 p \Delta t} e^{-i\omega_0 \tau} z^{DC}(p\Delta t + \tau \Delta t) \approx e^{-i\omega_0 p \Delta t} e^{-\omega_0 \Sigma} z^{DC}(p\Delta t)$$

The differences of the timing within a small subgroup of the antennas are so small that the time difference inside the IQ part needs not to be taken into account, when calculating the sum over that subgroup. Instead, we can just calculate the sum:

$$z_{group}^{iq}(t) = \sum_{q \in group} e^{-i\omega_0(\tau_q - \tau_{group})} z_q^{iq}(t)$$

where $\tau_{group}$ is the delay to the center point of the group.

Thus, inside a small subgroup, we only need to sum up the signals from different antennas multiplied by phase factors depending on the direction of the beam. We may need to calculate many different sums of this kind depending on the number of beam directions we want to synthesize. When summing up signals from these groups together, it is most advantageous to use true time delays, as the phase corrections may no longer be accurate enough.

Thus, in the following we assume that the phase-corrected sums of signal samples are calculated in the sampling units dedicated to a small subgroup of antennas. The more costly true time delays are then left for the central computer to do. In a tree-like solution for the cluster topology they are done by the closer-to-root levels of the tree.

Minimum Requirements for Processing

We conclude this description by some discussion of the minimum processing requirements that a phased array radar system may pose.

We assume the system comprises basic sampling units, which are basically the same as the conceptually described antenna units earlier in this description. The basic units serve a small group of antennas (maybe 7, 32 or 49—or maybe even 1), are each capable of sampling the signals and doing basic IQ detection and are equipped with a computer (such as a Linux computer for example) to facilitate further signal processing like beamforming and interferometry in the computer cluster. The signal processing done in the basic units is referred to as Level 1 processing.

The computer cluster is built from the basic unit computers with fast interconnects, possibly augmented by a hierarchy of more powerful computers to optimize the cluster operation. The duties remaining for the cluster are referred to as Level 2 processing. In the following subsections we study first the minimum requirements set to both the Level 1 units as well as the Level 2 cluster.

While 80 MHz sample rates were earlier mentioned as an example, that is not a good rate with the most probable EISCAT3D operating frequency 235 MHz. A 80 MHz sample rate facilitates a maximum useable band of 220±20 MHz, thus meaning a maximum of ±5 MHz around 235 MHz. On the other hand, 100 MHz would facilitate 225±25 MHz, thus making 235±15 MHz possible. Other sampling rates may also be possible, but a round number is in many ways useful.

The following assumptions apply to Level 1 processing:
The number of antennas is some small number, for example 7, 32 or 49 or something else which can be used to divide the honeycomb structure in regular pieces. Maybe 16 and 20 work here, too. Even a group size 1 might be considered so that each antenna would have its own CPU for processing.
Each antenna outputs two signals, one for each polarization.
The Level 1 unit must be able to sample these signals at 100 MHz and perform sustained IQ detection on all signals at IQ rate of 50 M IQ pairs/second. Signal bandwidth is limited to less than 30 MHz by analog filters.

In addition to the basic IQ rate the Level 1 units must be capable of producing a number of alternative rates, for example 1, 2, 4, 5, 10, 20, and 50 M IQ pairs/second. This is most probably accomplished by the CPU in the unit, so that the sampling FPGA can always process 50 M/s data.

It must be possible to handle the polarization at the Level 1 unit, so that one can choose, whether a single combined channel is produced or whether 2 independent polarizations are taken through the system. As a benchmarking requirement a combined single channel may be assumed.

The throughput must be good enough to produce 5 partially beamformed 50 MHz IQ sample streams throughout the cluster network. At Level 1 it is enough to do this partial beamforming by complex phase corrections, as true time delays are not necessary with such small differences in timing. If lesser IQ rates are used, it must then be possible to produce correspondingly more than 5 simultaneous partially beamformed streams.

Using the 5 partially beamformed and polarization-combined beams of 50 M IQ pairs/second as a basic benchmarking goal, the following conclusions can be drawn:

The data bandwidth from each antenna to Level 1 computer is 200 MB/second for each polarization. This is the same regardless whether the raw signal samples are taken to the computer or whether IQ signals are calculated in an FPGA integrated to the antenna or AD converter. If the integrated FPGA does polarization combination, the data bandwidth is halved here.

The IQ processing needs an approximately 30-tap filter for the imaginary part. It must operate at 50 MHz (half the sample rate). Real part comes for free. Rather cheap FPGAs should be able to do this.

If the IQ processing is done in software, this amounts to about 30 Gflop/s for each polarization. Thus, the best computers for this purpose known at the time of writing this description (up to 200 Gflop/s) could handle only 2 or 3 antennas. So, doing this in software is not very probable, taken the computer technology known at the time of writing this description, though using GPU processing power might work here.

Making 5 simultaneous partially formed beams by complex coefficients requires 2 Gflop/s for each signal. Today's best computers could thus handle close to 100 signals, so this is very realistically left for software to do.

Some assumptions can be made about the minimum requirements for Level 2 processing:

The data rate resulting from 5 partially beam-formed 50 MHz IQ streams is 1 GB/s.

True time-delay of 5 50 MHz IQ streams with 30 MHz useable bandwidth requires approximately 30 tap filters with real coefficients and complex data, totaling 30 Gflop/s computational power.

For a cluster network with data going in 3 directions simultaneously, the link speed needs to be (⅓)·1 GB/second, easily available with e.g. 10G Ethernet connections. For a tree-like network we would need to take the full 1 GB/s through each link, which might be problematic with a single 10G Ethernet. Thus, dual links could be necessary unless we ease the requirements a little.

The total communications speed in a network cluster node is 1 GB/s in and 1 GB/s out for each node, which is easily accomplished. For a tree network it is 7 GB/s in and 1 GB/s out for each node in the hierarchy. The main bottlenecks here are the computer buses, where at the time of writing this description the PCIe can transport 32 GB/s and RAM access is 15 GB/s per core. So this should also be possible.

The computational speed in a network cluster would be 3·30=90 Gflops/s, about half the throughput of best 8-core computers of the time of writing this description. In a tree-like network a single computer would need to join together signals from 7 neighbors, amounting to 210 Gflop/s, which is slightly over the theoretical speed of the best computers of the time of writing this description. Future development and/or GPU processing are likely to solve this problem. Trees with other number of branches instead of 7 might also be considered.

A tree-like structure may be very interesting, because of the following aspects:

The latency of a beam-forming sum is only 3 transfers long in a network of $7^3$ of 49-antenna nodes, while in the networked solution it takes much longer to transport the signals through every computer so that the sum can be made.

It might be advantageous and cost-effective to use more powerful computers closer to the root of the tree and cheapest possible ones as the sampling computers.

This way the system might also be easier to keep up-to-date. It is not likely that the operator would want to change the sampling computers very often. In a $7^5=16807$ array there are $7^3=343$ of them—assuming 49 antennas in each Level 1 group—but it would be less of a problem to update the 49+7+1 computers in the rest of the tree.

Some examples of practical solutions for Level 1 units that are known at the time of writing this description are:

USRP2 software radio peripheral by Ettus Research (a National Instruments Company)

National Instruments flexrio hardware and PXIe bus a combination of Xilinx FPGA sampling and communications hardware, including Xilinx RocketIO™ serial communications links.

CONCLUSIONS

Variations and modifications are possible to the embodiments of the invention discussed above. For example, although a fiber optic connection involves a number of advantages for use as the data collection line, the invention does not in any way require the data collection line to be implemented with fiber optics. A hierarchical data collection structure of the kind illustrated in FIG. 10 may have more than two levels. At least some of the antennas of the antenna array may be used also for transmitting, in which case the antenna units may comprise the transmission amplifiers or these may be implemented separately. The transmission of signals can be controlled with control information circulated in the extra slots of the data collection frames. Timing signals can be delivered to the antenna units also through wireless timing transmissions, for example so that at a certain distance from the antenna array, at a location from which the signal can be reliably received by all antennas, is a wireless timing signal transmitter.

The invention claimed is:

1. A signal processing and communicating device for use in an antenna array, comprising:

a measurement signal receiver for receiving and digitizing a measurement signal from an antenna;

a time delay device for delaying the digitized measurement signal;

a data collection receiver for receiving a data collection frame, the data collection frame comprising at least one slot capable to store delayed digitized measurement signal values; and a data collection transmitter;

wherein the data collection transmitter is configured to sum the delayed digitized measurement signal with pre-existing data in the data collection frame received and to transmit the data collection frame after summing further at a data rate that is independent of how many other signal processing and communicating devices the data collection frame is to be circulated among.

2. The signal processing and communicating device according to claim 1, wherein the signal processing and communicating device comprises an internal controller, and wherein the data collection receiver is configured to read control information from a received data collection frame and to forward the control information to said internal controller.

3. The signal processing and communicating device according to claim 1, wherein the time delay device is configured to produce a multitude of delayed copies of the digitized measurement signal, and wherein the data collection transmitter is configured to sum said delayed copies of the digitized measurement signal with pre-existing data in different parts in the received data collection frame.

4. The signal processing and communicating device according to claim 1, further comprising a weighting device for weighting the digitized measurement signal before, after, or during delaying of the digitized measurement signal in the time delay device.

5. The signal processing and communicating device according to claim 1, further comprising a timing device configured to synchronize an internal time base of the signal processing and communicating device with a timing indicator associated with the received data collection frame.

6. An antenna array arrangement, comprising:
a multitude of antennas;
a multitude of signal processing and communicating devices, each coupled to receive a measurement signal from at least one of said multitude of antennas, and each signal processing and communicating device is configured to digitize and delay the received measurement signal(s);
a central processing station; and
a data collection line coupling said multitude of signal processing and communicating devices to said central processing station;
wherein said multitude of signal processing and communicating devices form a chain along said data collection line;
wherein said central processing station is configured to read a sum of delayed digitized measurement signals from a data collection frame conveyed to the central processing station along said data collection line at a data rate that is independent of how many signal processing and communicating devices are in said chain, wherein the data collection frame comprises at least one slot capable to store delayed digitized measurement signal values.

7. The antenna array arrangement according to claim 6, wherein said central processing station is configured to read a multitude of sums of differently delayed digitized measurement signals from different parts of said data collection frame.

8. The antenna array arrangement according to claim 6, further comprising at the central processing station, a control information transmitter configured to transmit control information to said multitude of signal processing and communicating devices along a control information channel.

9. The antenna array arrangement according to claim 8, wherein said data collection line is loop-formed, and said control information channel constitutes a logical channel conveyed on said loop-formed data collection line.

10. The antenna array arrangement according to claim 6, wherein at least one of said signal processing and communicating devices is configured to write auxiliary information to a dedicated part of said data collection frame, said dedicated part being different from the part that contains the sum of delayed digitized measurement signals, and wherein said central processing station is configured to read auxiliary information from said dedicated part of said data collection frame.

11. The antenna array arrangement according to claim 6, wherein at least one antenna has a shape of a slanted bowtie antenna, which slanted bowtie antenna comprises:
a container for the electronics; and
a support structure comprising four legs, the four legs together forming at least one wideband antenna.

12. The antenna array arrangement according to claim 6, wherein at least one antenna has a shape of a screwpile, the screwpile antenna comprising:
a stilt;
a container for the electronics;
a coarse spiral thread at a sharp end of the stilt; and
radial spars extending to the sides of the stilt.

13. A method for operating an antenna array, comprising:
digitizing measurement signals received through a multitude of antennas;
delaying each digitized measurement signal, thus producing respective delayed digitized measurement signals;
circulating a data collection frame through a chain of signal processing and communicating devices that digitized and delayed their respective received measurement signals of the signal processing and communicating devices, wherein the data collection frame comprises at least one slot capable to store delayed digitized measurement signal values;
summing at each signal processing and communicating device the respective delayed digitized measurement signal with pre-existing data in the data collection frame; and
conveying the circulated data collection frame to a central processing station of the antenna array at a data rate that is independent of how many signal processing and communicating devices are in said chain.

14. The method according to claim 13, further comprising making at least some of said signal processing and communicating devices produce two or more differently delayed copies of the respective digitized measurement signals of the at least some of said signal processing and communicating devices and sum these differently delayed copies with pre-existing data in different parts of said data collection frame.

15. The method according to claim 13, further comprising initiating the circulation of said data collection frame by sending the data collection frame from said central processing station to a first signal processing and communicating device in said chain.

16. The method according to claim 15, further comprising conveying control information in the data collection frame from said central processing station to at least some of said signal processing and communicating devices.

17. The method according to claim 13, further comprising conveying auxiliary information from at least one of said signal processing and communicating devices to said central processing station in a dedicated part of said data collection frame, said dedicated part being different from the part that contains the sum of delayed digitized measurement signals.

18. A signal processing and communicating device for use in an antenna array, comprising:
- a measurement signal receiver for receiving and digitizing a measurement signal from an antenna;
- a time delay device for delaying the digitized measurement signal to yield a delayed digitized measurement signal, wherein the digitized measurement signal is delayed independently of a phase of the digitized measurement signal;
- a data collection receiver for receiving a data collection frame, the data collection frame comprising at least one slot capable to store delayed digitized measurement signal values; and
- a data collection transmitter configured to sum the delayed digitized measurement signal with the delayed digitized measurement signal values from previous signal processing and communicating devices already stored in the at least one slot of the data collection frame received by the data collection receiver to yield an updated data collection frame, wherein the data collection transmitter is further configured to transmit the updated data collection frame to another signal processing and communicating device, wherein the updated data collection frame is transmitted at a data rate that is independent of how many delayed digitized measurement signals have been summed in the updated delayed data collection from the previous signal processing and communicating devices.

19. The signal processing and communicating device according to claim 18, wherein the time delay device is configured to produce a multitude of delayed copies of the digitized measurement signal, and wherein the data collection transmitter is configured to sum the delayed copies of the digitized measurement signal with delayed digitized measurement signal values from previous signal processing and communicating devices already stored in the data collection frame received by the data collection receiver, wherein the delayed digitized measurement signal values from previous signal processing and communicating devices are stored in different parts in the data collection frame.

20. The signal processing and communicating device according to claim 18, further comprising a timing device configured to synchronize an internal time base of the signal processing and communicating device with a timing indicator associated with the data collection frame received by the data collection receiver.

* * * * *